(12) United States Patent
Secor

(10) Patent No.: US 12,281,806 B1
(45) Date of Patent: *Apr. 22, 2025

(54) WIRELESS SENSORS SYSTEM AND METHOD OF USING THE SAME

(71) Applicant: Evergreen Telemetry LLC, Mesa, AZ (US)

(72) Inventor: Russell Peter Secor, Mesa, AZ (US)

(73) Assignee: Evergreen Telemetry LLC, Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,031

(22) Filed: Sep. 9, 2022

Related U.S. Application Data

(63) Continuation of application No. 17/094,436, filed on Nov. 10, 2020, now Pat. No. 11,441,798, which is a
(Continued)

(51) Int. Cl.
*F24F 3/02* (2006.01)
*F24F 11/00* (2018.01)
(Continued)

(52) U.S. Cl.
CPC .......... *F24F 11/0001* (2013.01); *F24F 11/30* (2018.01); *F24F 11/523* (2018.01); *F24F 11/526* (2018.01); *F24F 11/56* (2018.01); *F24F 11/62* (2018.01); *F24F 11/63* (2018.01); *G05B 19/042* (2013.01); *G05B 19/048* (2013.01); *F24F 2011/0002* (2013.01); *F24F 11/52* (2018.01); *F24F 2110/10* (2018.01); *F24F 2110/12* (2018.01); *F24F 2110/20* (2018.01); *F24F 2110/30* (2018.01); *F24F 2110/40* (2018.01); *F24F 2110/70* (2018.01);
(Continued)

(58) Field of Classification Search
USPC ........................................................ 700/276
See application file for complete search history.

(56) References Cited

U.S. PATENT DOCUMENTS

| 4,481,829 A | 11/1984 | Shortridge et al. |
| 4,754,651 A | 7/1988 | Shortridge et al. |

(Continued)

FOREIGN PATENT DOCUMENTS

| DE | 102004054429 A1 * | 5/2006 | ............... G01F 1/46 |
| DE | 102004062684 A1 | 6/2022 | |

OTHER PUBLICATIONS

Eurotech Group, "Digital Technologies for a Better World: Sensors Network Solutions" 2008, 23 Pgs., (Year: 2008).*
(Continued)

*Primary Examiner* — Emilio J Saavedra
(74) *Attorney, Agent, or Firm* — IPTechLaw

(57) ABSTRACT

An apparatus, system, and methods for measuring environmental parameters are disclosed. The apparatus, system and methods can be used for a variety of applications, including HVAC air balancing and building commissioning. The system includes a variety of wireless sensing modules and wearable modules for control. display, and storage. Parameters measured include air and water temperature, pressure. velocity, and flow. Also included are sensors for light intensity, CO concentrations, and CO2 concentrations.

18 Claims, 20 Drawing Sheets

Related U.S. Application Data continuation of application No. 15/472,172, filed on Mar. 28, 2017, now Pat. No. 10,830,466, which is a continuation of application No. 13/136,814, filed on Aug. 11, 2011, now Pat. No. 9,605,857.

(60) Provisional application No. 61/463,549, filed on Feb. 19, 2011, provisional application No. 61/401,336, filed on Aug. 11, 2010.

(51) Int. Cl.
| | |
|---|---|
| F24F 11/30 | (2018.01) |
| F24F 11/523 | (2018.01) |
| F24F 11/526 | (2018.01) |
| F24F 11/56 | (2018.01) |
| F24F 11/62 | (2018.01) |
| F24F 11/63 | (2018.01) |
| G05B 19/042 | (2006.01) |
| G05B 19/048 | (2006.01) |
| F24F 11/52 | (2018.01) |
| F24F 110/10 | (2018.01) |
| F24F 110/12 | (2018.01) |
| F24F 110/20 | (2018.01) |
| F24F 110/30 | (2018.01) |
| F24F 110/40 | (2018.01) |
| F24F 110/70 | (2018.01) |
| F24F 110/72 | (2018.01) |
| F24F 140/00 | (2018.01) |

(52) U.S. Cl.
CPC ....... *F24F 2110/72* (2018.01); *F24F 2140/00* (2018.01); *G05B 2219/23136* (2013.01); *G05B 2219/24084* (2013.01); *G05B 2219/2614* (2013.01); *Y02B 30/70* (2013.01)

(56) References Cited

U.S. PATENT DOCUMENTS

| | | | |
|---|---|---|---|
| 7,965,178 B1 | 6/2011 | Schmuttor et al. | |
| 8,322,151 B1* | 12/2012 | Garofalo | F24F 11/62 62/149 |
| 10,041,687 B1 | 8/2018 | Caneba | |
| 2002/0064416 A1 | 5/2002 | Varner et al. | |
| 2004/0183751 A1 | 9/2004 | Dempski | |
| 2005/0034533 A1 | 2/2005 | Wang | |
| 2005/0088299 A1 | 4/2005 | Bandy et al. | |
| 2005/0173548 A1* | 8/2005 | Kramer | F24F 11/74 236/94 |
| 2008/0115587 A1* | 5/2008 | Tang | H04Q 9/00 454/238 |
| 2008/0252445 A1 | 10/2008 | Kolen | |
| 2008/0281528 A1* | 11/2008 | Relle, Jr. | G01N 1/2273 702/50 |
| 2009/0143915 A1 | 6/2009 | Dougan | |
| 2009/0241688 A1 | 10/2009 | Reichel | |
| 2009/0253383 A1 | 10/2009 | Becker et al. | |
| 2009/0302994 A1 | 12/2009 | Rhee et al. | |
| 2010/0195694 A1 | 8/2010 | Claassen et al. | |
| 2011/0017413 A1 | 1/2011 | Hunckler et al. | |
| 2019/0064132 A1 | 2/2019 | Poecher et al. | |

OTHER PUBLICATIONS

Omega, "zSeries Wireless Sensor system Web-Based Monitoring," May 3, 2008, accessed at https://web.archive.org/web/20080503233445/ http://www.omega.com/ppt/pptsc.asp?ref=Zseries&Nav=dask0.

Eurotech, "Digital Technologeis for a Better World: Sensors Network Solutions" 2008, 23 pgs.

Testo product webpages, 2009—accessed at http://www.alkencolon.com by way of https://web.archive.org—7 pgs.

Fluke Corporation, "HVAC pressure applications with the Fluke 922: Application Note" 2007, 4 Pgs.

Kortuem et al., "Context-Aware, Adaptive Wearable Computers as Remote interfaces to 'Intelligent' Environments," IEEE Conference: Wearabel Computers, 1998. Digest of Papers. Second International symposium, 8 Pgs.

Paragon Controls Incorporated, "Paragon Controls Incorporated-Master Catalog 2009-2010" 2010: 258 Pgs.

Billinghurst et al., "Wearable devices; new ways to manage information," Computer (vol. 32, Issue: 1) Jan. 1999, pp. 57-64.

Kortuem et al., "Netman: The design of a collaborative wearable computer system," Mobile Networks and Applications, Issue 4 (1999), pp. 49-58.

TSI Incorporated, "Alnor HVAC Handbook: A practical Guide to Performance Measurements in Mechanical Heating, Ventilating and Air Conditioning Systems," 2007 pp. 1-54.

TSI Incorporated, "Air Measurement Instruments" 2008 pp. 5-16.

Lynch et al., "Overview of a cyber-enabled wireless monitoring system for the protection and management of critical infrastructure systems," Proc. SPIE 7294, Nondestructive Characterization for Composite Materials, Aerospace Engineering, Civil Infrastructure, and Homeland Security 2009, 72940L (Apr. 8, 2009). pp. 1-11.

TSI Incorporated, "TSI/Alnor Teams Up with AIRNAB" Memorandum Release. Apr. 15, 2009, pp. 1-2.

Kimo Instruments, "Portable Instruments" Kimo Instruments Catalog, Sep. 22, 2010, 22 Page PDF, accessed at https://web.archive.org/web/20100922133557/http://kimo.es/PDFs/catalogos/Equipos%20Portatiles.pdf (Year: 2010).

Kimo, "AMI 300 Multifunction" Dec. 4, 2008, 5pg printput, accessed at: https://web.archive.org/web/ 20081204005448/ http:// www.kimo.fr/www/php/ telecharger_fiche.php4?id-%2Fdata%2Fportables_2008%2Fpdf%2Fen%2Fclass+300%. (Year: 2008).

Kimo, "Control and Measuring Instruments" Nov. 22, 2008, 1 pg Printout, accessed at https://web.archive.org/web/20081122005448/ http://www.kimo.fr/www/index.php4?lang=en&page=niveaux&N IV4= OK&FI N4 (Year: 2008).

Fluke Corporation, "How to make a duct traversal airflow measurement" Application Note, 2007, 3 Pgs. (Year: 2007).

Omega Industries, "User's Guide HHP-401 Series Digital Manometer" Omega Engineering Inc., 1999, 7 pgs. (Year: 1999).

National Environmental Balancing Bureau, "Procedural Standards for testing Adjusting and Balancing of Environmental Systems" 2005, 118 pages (Year: 2005).

\* cited by examiner

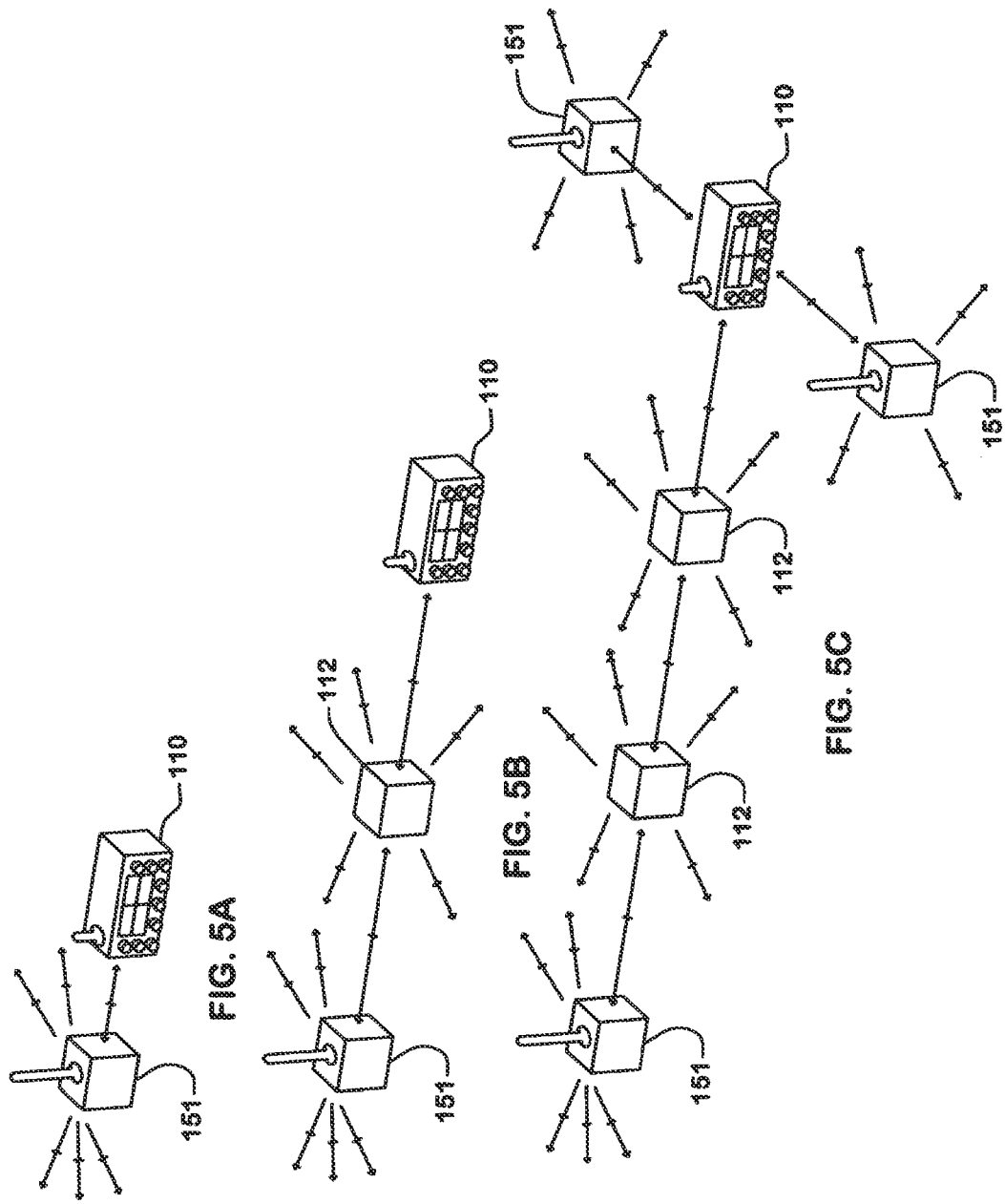

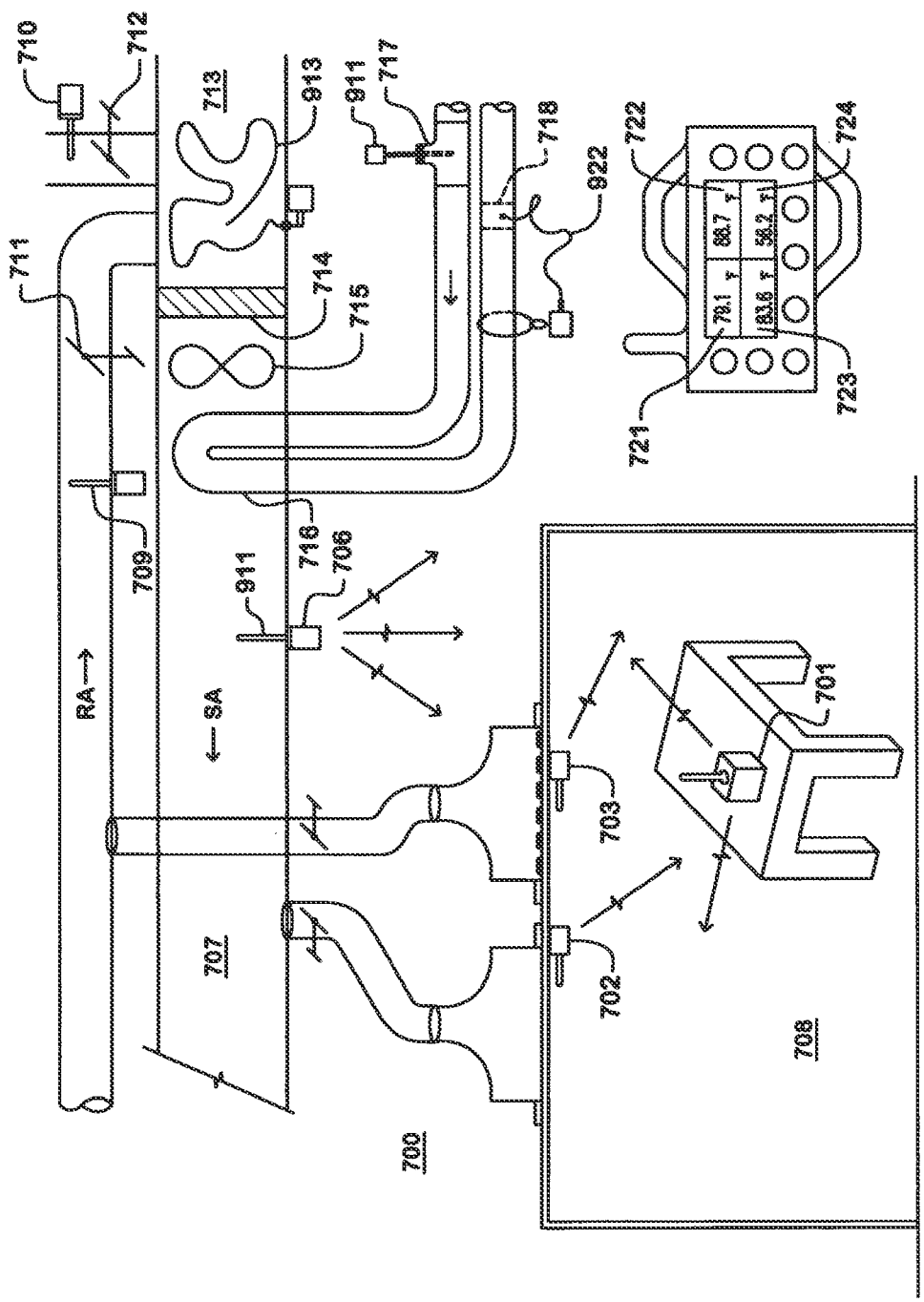

| S1 | 73.5 °F | S2 | 82.3 °F |
|---|---|---|---|
| AA124 | | | |

FIG. 8E

| S1 | 73.2 °F | S1 | 43.5 % |
|---|---|---|---|
| S2 | 65.4 °F | S2 | 57.9 % |
| AA165 | | | |

FIG. 8F

| S1 | 75.4 °F | S2 | 29.6 Hg |
|---|---|---|---|
| S3 | 35.6 % | S4 | 1.34 INWC |
| AB356 | | | |

FIG. 8G

| REC | | | 05/24/10 |
|---|---|---|---|
| 1 | S1 | 01:13:30 | 73.2 °F |
| 2 | S2 | 01:13:41 | 74.6 °F |
| 3 | S1 | 01:13:55 | 75.8 °F |

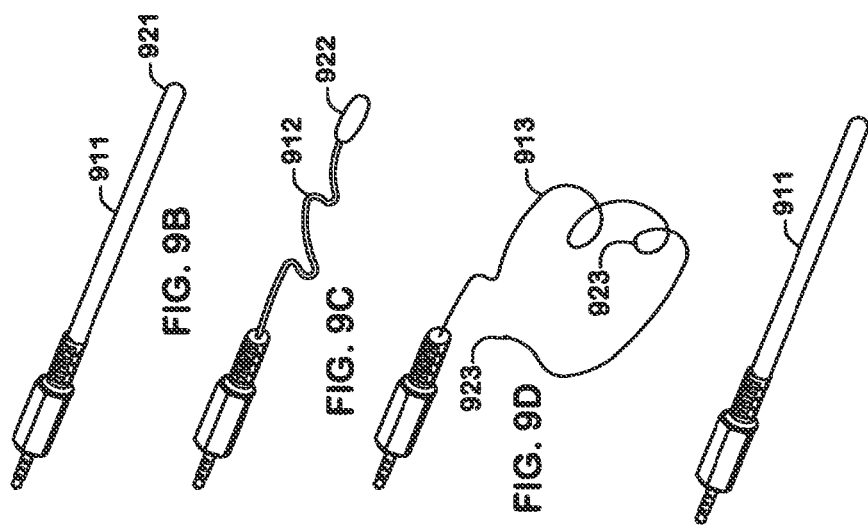
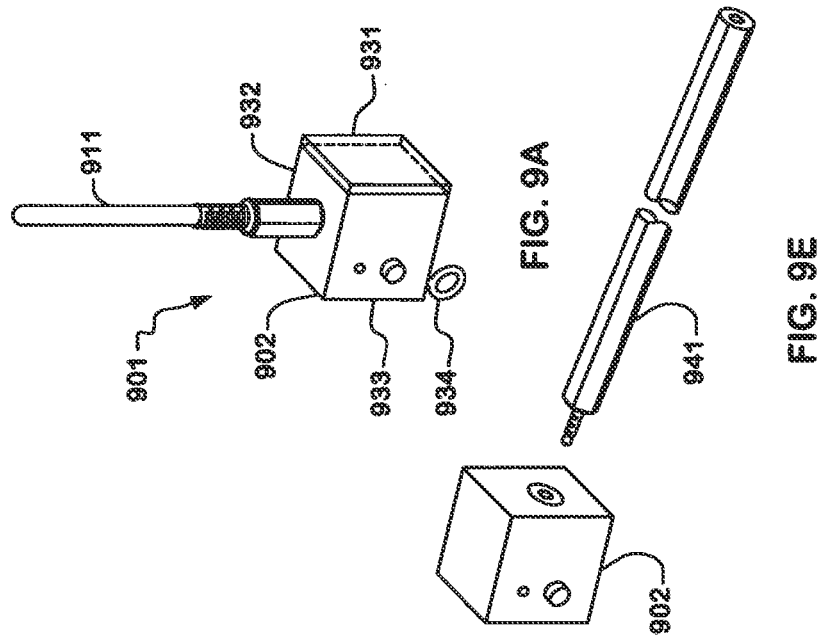

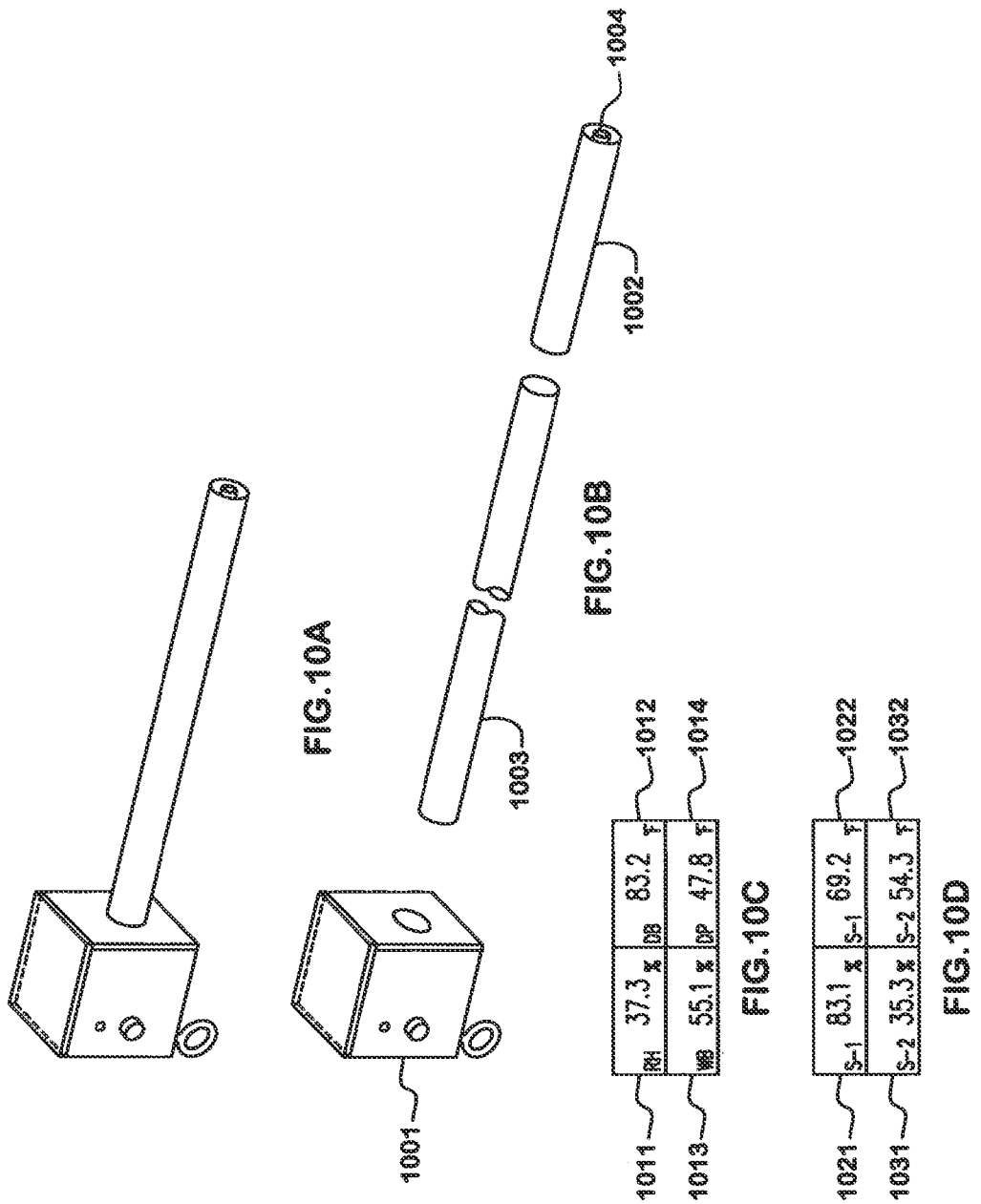

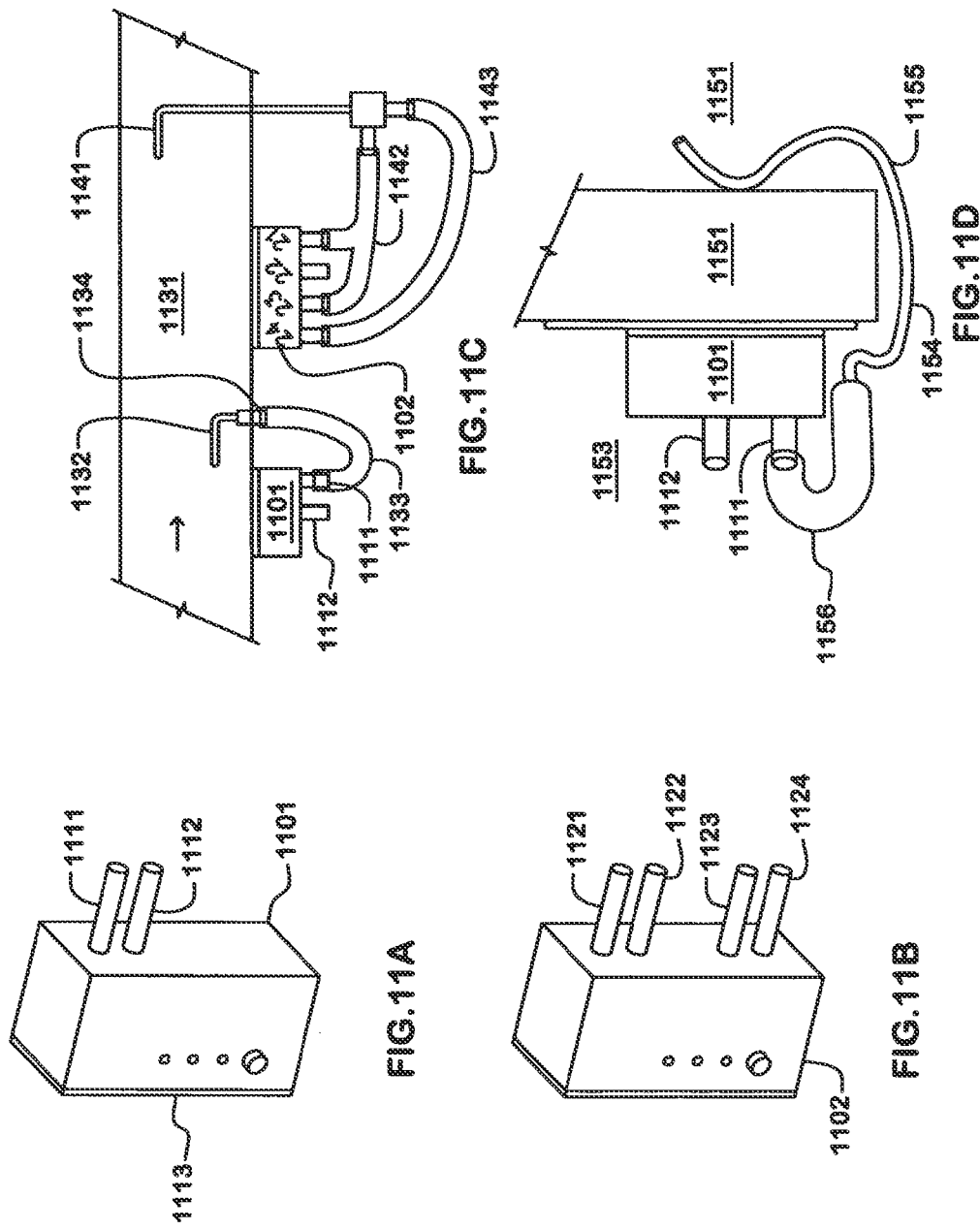

| 325 FPM | 333 310 265 | 308 333 265 | Avg Max Min | 70.0 °F |
|---|---|---|---|---|
| 1.23 inW | 1.21 1.32 1.27 | 1.26 1.32 1.21 | Avg Max Min | 50.0 %RH 28.8 Hg 0.15 #ct 1.00 ft |
| AA | 12 | 325 | CFM | |

| 325 FPM | 308 333 265 | Avg Max Min | 70.0 °F 50.0 %RH |
|---|---|---|---|
| 1.23 inW | 1.26 1.32 1.21 | Avg Max Min | 28.8 Hg 0.15 #ct 1.00 ft |
| AA | 12 | 325 CFM | |

| 325 FPM | 333 310 265 | 308 333 265 | Avg Max Min |
|---|---|---|---|
| 1.23 inW | 1.21 1.32 1.27 | 1.26 1.32 1.21 | Avg Max Min |
| AA | 12 | 325 | CFM |

| 325 FPM | 308 333 265 | Avg Max Min | 70.0 °F 50.0 %RH 28.8 Hg |
|---|---|---|---|
| 1.23 inW | 1.26 1.32 1.21 | Avg Max Min | 0.15 #ct 1.00 ft |
| AA | 12 | 325 CFM | |

| 70.0 °F DEF | 50.0 %RH DEF |
|---|---|
| 28.8 inHg | 0.075 lb/FT³ |

| Length 12.0 IN | Width 12.0 DEF | 325 FPM |
|---|---|---|
| 1.00 FT² DEF | | 325 CFM |

| 70.0 °F DEF | 50.0 %RH DEF |
|---|---|
| 28.8 inHg | 0.075 lb/FT³ |

| Length 12.0 IN | Width 12.0 DEF | 325 FPM |
|---|---|---|
| 1.00 FT² DEF | | 325 CFM |

FIG. 15

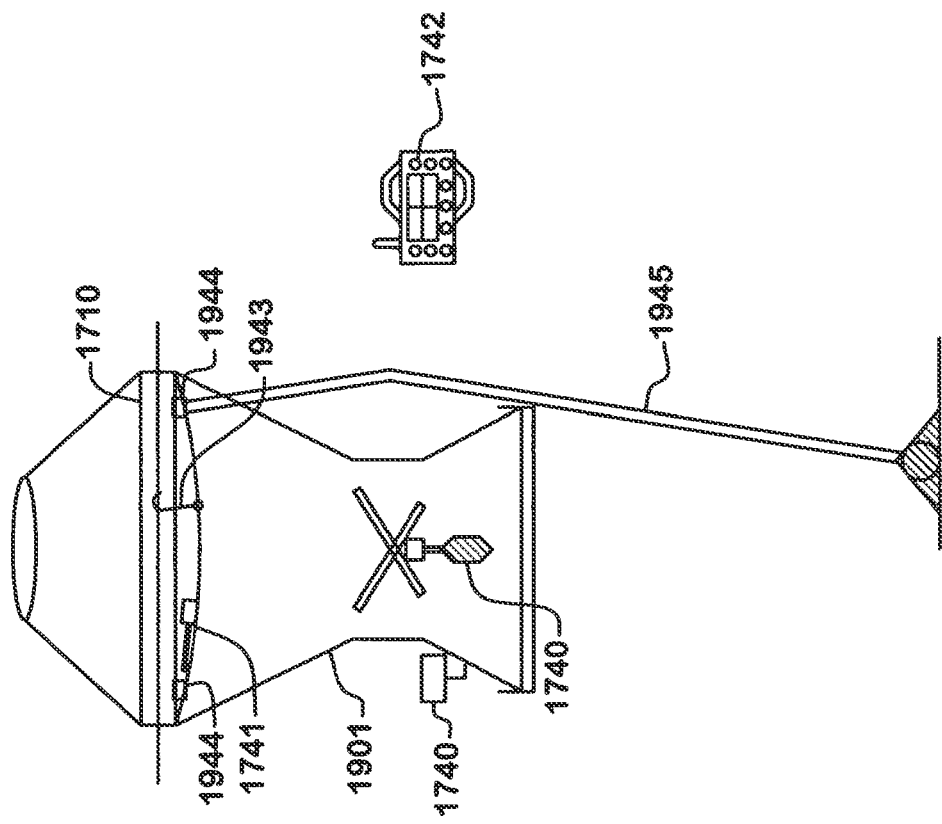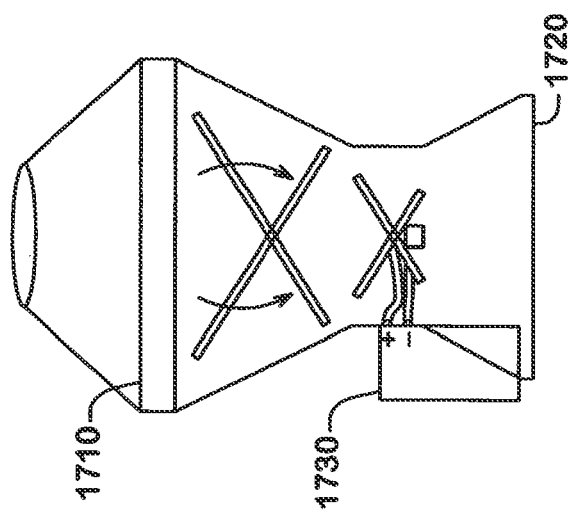
FIG. 19

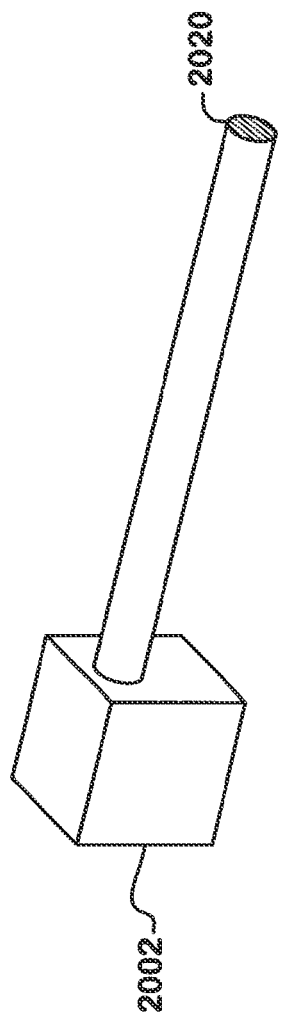
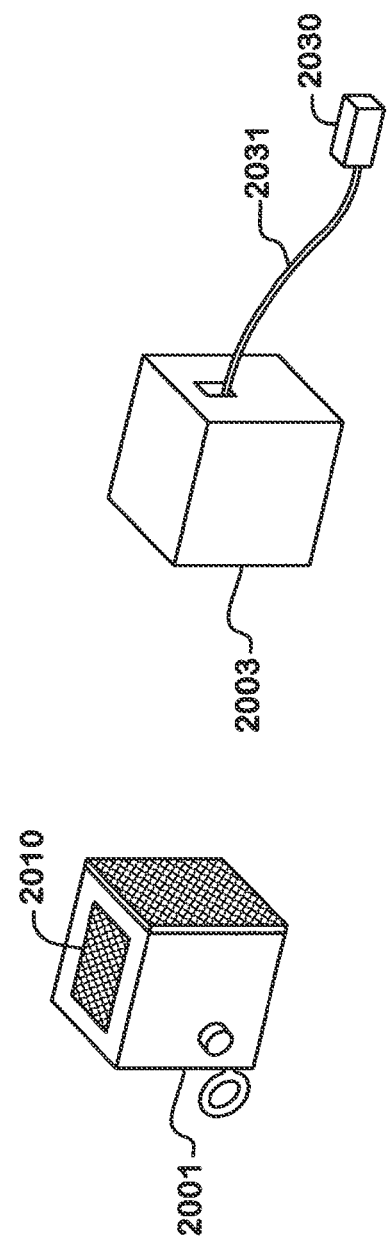
FIG. 20A
FIG. 20B
FIG. 20C

WIRELESS SENSORS SYSTEM AND METHOD OF USING THE SAME

CROSS REFERENCE TO RELATED APPLICATIONS

This application is a continuation application of the earlier U.S. Utility Patent Application to Secor entitled "Wireless Sensors System and Method of Using Same," application Ser. No. 17/094,436, filed Nov. 10, 2020, now pending, which application is a continuation application of the earlier U.S. Utility Patent Application to Secor entitled "Wireless Sensors System and Method of Using Same," application Ser. No. 15/472,172, filed Mar. 28, 2017, issued as U.S. Pat. No. 10,830,466 on Nov. 10, 2020, which application is a continuation application of the earlier U.S. Utility Patent Application to Secor entitled "Wireless Sensors System and Method of Using Same," application Ser. No. 13/136,814, filed Aug. 11, 2011, issued as U.S. Pat. No. 9,605,857 on Mar. 28, 2017, which claims priority to U.S. Provisional Patent application Ser. No. 61/463,549 filed Feb. 19, 2011 entitled "System of Wireless Sensor with Wearable Controller," to Secor and claims priority to U.S. Provisional Patent application 61/401,336 filed Aug. 11, 2010, entitled "Wearable Wireless Instrument System," to Secor, the disclosures of each which are hereby incorporated entirely herein by reference.

BACKGROUND

1. Technical Field

The present disclosure generally relates to measuring environmental parameters such as temperature, humidity, and pressure. More particularly, the disclosure relates to system and method for measuring environmental parameters and wirelessly transmitting information to a display device.

2. Background

Problems

Instruments are often used to measure air and water parameters such as temperature, humidity, pressure, air velocity, airflow, and many other environmental parameters. These measurements take place in buildings, factories, outdoor weather stations, and other locations. Instruments may be rack-mount, desk mount, mobile/handheld, or other.

A typical instrument consists of a plastic case enclosing a printed circuit board with microprocessor-controlled electronics, memory, one or more sensors, and a display. The sensors are often in a wand-shaped probe. Various probes, large and small, are designed to collect environmental samples for sensing, measurement, display, and storage. When using this type of instrument, a user has both of his hands occupied, one to hold the meter, and one to hold the probe and extend it to the location of interest, such that a user's hands are not available for other tasks. Cables, wires, and/or tubes typically dangle between the probe and the meter.

For Heating, Ventilation, Air Conditioning, and Refrigeration (HVAC) applications, engineers and technicians who work in buildings deal with many different types of instruments. There are building automation systems (BAS), fire safety systems, occupancy detection and security, permanently installed instruments such as pressure, temperature, humidity, and airflow, with some nearby and some remote sensors, and portable instruments for such parameters as temperature, pressure, humidity, sound/noise, light intensity, carbon dioxide, velocity, flow, and others. As engineers and technicians move throughout the structure to solve problems, they often lack access to required information, and must either move to a central location for access to data, or must carry a variety of instruments with them. Lacking is an overall system for quick access to desired information.

Engineers and technicians commonly require two types of measurements. One is immediate feedback when finding and/or solving a problem, as when measuring the temperature of air being supplied at a diffuser. The second is a series of measurements at regular intervals from one or many locations, for comparison and contrast of parameters that may indicate problems that occur over time.

Measurement problems are important to the HVAC industry. Measurement disputes are often at the heart of conflicts over HVAC performance issues such as uncomfortable buildings, inefficient energy performance, and inability to maintain specified parameters such as adequate positive pressure in hospital operating rooms. These conflicts frequently result in anger, confusion, disputes, cancelled contracts, lawsuits, mediation, and unhappy building owners, tenants, and workers. Contributing to these conflicts is that measurements of HVAC-related building parameters such as air and water temperature, humidity, pressure, velocity, and flow are perceived to be inaccurate and unreliable, so dissatisfied parties often challenge their validity. Accordingly, an improved system and method that improves the accuracy and speed of measuring building parameters and the safety with which they are measured by technicians are desired.

Flow, airflow, and water flow are industry terms that relate to the volumetric rate of fluid flow expressed in units such as cubic feet per minute (CFM) or gallons per minute. Airflow is usually not measured directly. It is usually calculated by measuring the velocity of air at multiple points in a cross-sectional plane, calculating an average velocity at the plane, and then multiplying by the known area of the cross-section. The plane where measurement takes place might be across an air duct, in a duct-shaped probe like a capture hood, or at the opening of a fume hood, door, or window.

These are long standing problems in several different measurement applications related to HVAC.

Exemplary Problem 1. Wasteful Back and Forth Travel

Technicians are concerned with the occupied spaces and the system controls that are spread all over the building, from the facilities space with the fan, coils, pumps, pipe, compressor, and/or evaporation tower, through the duct system to the occupied spaces. In many cases the point of interest to an operator or technician is some distance removed from the forces or controls that cause the conditions at the point of interest. To adjust the controls for improved operation requires a lot of back and forth movement during a repetitious cycle of measurements and adjustments. They must measure at one location, then move to another location to effect a repair or adjustment. Then they must return to the original location to measure the impact of the change. This wastes time and leads to approximations. What is needed is real-time data at the point of control, so changes can be readily evaluated and adjustments made precisely as specified.

Exemplary Problem 2. Poor Communication within Teams

A second problem of conventional practice in HVAC measurements relates to technicians who work in teams of two or more. Measurements are usually taken by one person. Team members who need the information must receive it from the one who took the reading, usually by speaking, shouting, or walking to a conference, or sometimes via walkie-talkie or cell phone.

Exemplary Problem 3. Instrument Limitations

A third problem with existing instruments is that they provide limited information with each measurement. For instance, during a velocity traverse of an HVAC duct, the technician may need to record a series of air velocity measurements, plus the air temperature, air humidity, barometric pressure, and the duct static pressure. The meter he uses may display only one of these parameters at a time. Further, he may have to change the setup of the meter between measurements to acquire all of the necessary information. Accordingly, an improved system and method to provide technicians with more of the information relating to a particular application are desirable.

One reason for this problem is that general-purpose instruments are being used for applications that are specific to operations such as air balancing. For instance, a differential pressure meter is attached via rubber tubes to a Pitot tube, and the combination used to determine the air velocity in the duct. It is desirable to have a tool designed specifically for HVAC applications such as duct velocity traverse.

Engineers and technicians do not have one system of convenient access to required information. Instead, they often use a wide variety of instruments, including BAS, temperature meters, humidity meters, air pressure meters, water pressure meters, air flow meters, water flow meters, etc. It is desirable to have the capability to quickly access any required measurement as they move throughout a building to find and fix problems. It is desirable to have a system and method that allow engineers and technicians to measure immediately and interactively, while also providing means to datalog the same measurement types at the same locations at regular intervals over a period of time.

Exemplary Problem 4. Instrument Style

A fourth problem in conventional practice has to do with the size and shape of instruments and the intended method for taking measurements. Many instruments are designed in the form of a hand-held probe attached with a coiled cord to a handheld meter. Taking a measurement occupies a technician such that he cannot do anything else with his hands at the same time. In connection with the measurements taken, it is often necessary for a technician to use his hands to climb a ladder, drill holes, screw or unscrew, or move a lever. A technician may have to set down an instrument in order to effect a repair or make an adjustment, and in so doing will lose sight of the meter readings. The existing type of instrument is clearly cumbersome in this context. It is desirable to have instruments that are relatively small, relatively light in weight, and easy to manipulate in the environment of interest.

Exemplary Problem 5. Instrument Size and Weight

Airflow capture hoods are used to collect the air being supplied by diffusers. One popular capture hood weighs 10 pounds and must often be held tightly against a ceiling diffuser. If the ceiling is high, the technician must employ a ladder. This type of procedure is difficult for most people to perform properly hour after hour, day after day. Fatigue, strain, and injuries are common. It is therefore desirable to have instruments that are relatively small, relatively light in weight, and easy to manipulate in the environment of interest.

Exemplary Problem 6. Accuracy and Reliability

As a result of Problems 1 through 5, measurements are often performed too quickly, improperly, inaccurately, or not at all, due to short cuts taken by technicians under stress. For instance, a technician who realizes that a measurement is likely because of circumstances to be inaccurate or unrepresentative is more likely to compromise, estimate, or skip the measurement. It is desirable to have instruments that are quick and easy to use and that can be trusted to achieve an accurate result.

Exemplary Problem 7. Manpower

Current practice is to use two-man teams, for some of the reasons listed above: safety; heavy, cumbersome instruments; working above the ground on ladders or scaffold; needing to be in two places for measurements and control adjustments. Accordingly, systems and methods that require less manpower are desired.

INDUSTRY APPLICATIONS

The following use cases are some industry procedures that illustrate the long standing problems mentioned above.

Set Point of Duct Static Pressure

In HVAC duct systems it is important to maintain duct static pressure set points at various locations in a duct system in order to maintain airflow through the duct and diffusers. For instance, a building engineer might specify that the fan generate a duct pressure that is 3 inches of water column above the ambient pressure in the building (static pressure), that the secondary supply air ducts that feed each floor be maintained at 2.5 inches of water column, and that the system of valves and dampers be adjusted such that the most remote air diffuser will be supplied air at a pressure of at least 0.5 inches of water column. If pressure is too low, the diffusers will not distribute conditioned air as designed and building comfort will suffer. If pressure is too high, energy is wasted by running the fan too fast. The electric power used increases at the cube of the duct pressure increase. For instance, if the fan speed is increased to raise the remote duct pressure to 0.55 inches, only 10% higher than required, the fan will use 30% more electric power than required. (The calculation has the form of $1.1 \times 1.1 \times 1.1 = 1.3$.)

Current procedure requires a technician to measure the pressure, then move through the building to adjust the fan and the dampers. He then returns to measure pressure again. This cycle of measurement and adjustment will be repeated until the specified result is achieved. Sometimes the fan is a long distance from the point being measured, and on a different floor. This repetitive procedure requires a lot of time and effort, and leads to the technician settling for some safe guardbanded pressure instead of achieving the precise result desired. This is one of the main sources of wasted energy in buildings. It is desirable for applications like this to provide a technician with an improved system and method for making measurements at the point of interest, and delivering results continuously to him where and when he is making the adjustment at the point of control.

Setting Outside Air Ventilation Controls

One of the most important functions in HVAC is to provide adequate ventilation, which is done by bringing in fresh air to replace used air that is infused with odors, body moisture, carbon dioxide, and other products of the indoor environment. This is a health issue, not just a comfort issue, and is strictly regulated. The volume of outside air needed is calculated according to industry formulas. Then the outside air dampers and control fans are adjusted by a degree estimated to achieve the correct volume.

This procedure often involves the measurement of several temperatures: outside air, indoor supply air, indoor return air, and the air inside the mixing chamber. The temperature in the mixing chamber is related to the temperature of return air and outside air, and the volumes of each. Adequate ventilation can be determined by measuring and comparing the different temperatures. Adjustments are made, and then the four temperatures are measured again. This is repeated until the mixed air temperature reaches a specific function of outside air and return air temperatures. Needed is a way to measure all four of these temperatures concurrently, and provide them in real time to the technician at the point of control, so he can quickly see the result of his adjustment.

Damper Setting and Proportional Balancing Method

Two technicians generally work together to adjust dampers to set airflow through supply diffusers to match specifications. One tech lifts up and holds a capture hood airflow probe against the diffuser, which is usually on the ceiling. He reads a meter attached to the capture hood. He calls out the reading. The second technician climbs a ladder and locates the damper adjustment above the ceiling tiles. He adjusts the damper until the measurement called out meets the specification. Needed is a way for the person doing the adjusting to be able to see the results of the adjustment in real time.

The meter must measure the temperature of the supply air in order to make an accurate reading. However, it takes a long time for temperature probes to properly register the actual temperature of air coming out of the duct, so technicians often ignore this requirement. Needed are means for quickly measuring the actual air temperature and using it to improve the accuracy of the measured airflow.

Also needed is a way for one person instead of two to perform this task. A stand or jack can be employed to hold the capture hood against a ceiling diffuser. This helps prevent the heavy and bulky hood from losing a seal, and it prevents weariness and injury to the operator. However, it is still necessary for the adjustor to have the measurement shouted over to him, or, if working alone, for him to leave the damper, climb down from the damper, walk to the capture hood, see the result on the meter, and return to the damper to make another adjustment.

A related industry method is the Proportional Balancing Method. Specifications often require that supply air diffusers be adjusted so that their airflows are all the same percentage of the specified airflow. For instance, if there are three diffusers, and the air available is 10% less than specified, then each air diffuser should be set to 90% of the specified flow. If the specified flows were 300, 200, and 100 cubic feet per minute (DFM), then the post-adjustment measurements should be 270, 180, and 90 CFM. However, duct systems with dampers and supply diffusers and return grills have paths to resistance of airflow that are interrelated. That is, if one path is made more resistant to airflow by adjustment of a damper, the air adjusts and goes somewhere else. This makes it difficult to set dampers the way they should be set. Usually the diffuser furthest from the fan is set by adjusting its damper. Then a second damper is adjusted. Then, the first diffuser must be measured again to determine if the second adjustment caused such a change in duct airflow distribution that the first diffuser airflow became out of range. The two dampers are adjusted again until they are both in spec. Then a third damper is adjusted. This continues until all diffusers on the same branch of the duct system are within the specified range. This takes a long time, with many repeated measurements. Each diffuser must be measured independently, one at a time, despite the fact that they are part of a connected and interdependent system. This method is repetitious and wastes time. It leads to compromise and non-ideal outcomes. What is needed is to see the effect of changes in real time.

Evaluation of Thermal Transfer Coil Efficiency

It is often important to measure the moisture content of air in ducts. A critical HVAC function is thermal energy transfer via coils. For instance, energy is used to remove moisture and cool air from outside that enters hot and humid. HVAC technicians must measure the temperature and moisture content of air before and after it is exposed to the bank of coils in order to determine whether the system is performing properly. Then the system is exercised to vary the load on the coils while measurements are taken. Needed for this application are means of concurrently viewing the incoming air temperature and humidity as well as the outgoing air temperature and humidity.

Water-Side Balancing

In HVAC machine rooms there are pipes running to and from the chillers, evaporators, pumps, and valves. It is necessary to measure water temperature and pressure in various places. These measurements are related to each other. At present is it time consuming to make iterative measurements between many adjustments to pump speeds and valve setting. Needed are means to see a variety of water pressures, temperatures, and water flows concurrently.

Velocity Traverse of Air Duct

The volume of air moving through a system of ducts is a frequently required figure in HVAC. System designers specify the air characteristics at specific locations throughout the duct system: leaving the fan, passing through filters and coils, delivered to the main duct on each floor, branch ducts, and finally supply air diffusers. The same is true for the return path to the fan intake, which begins at return air grilles in the occupied spaces, then past return air fans and dampers, mixing chambers where outside air enters, and into the main air handler intake. At each of these key points in the system, air balancers measure airflow volume, temperature, humidity, and duct static pressure.

Airflow volume is not measured directly in a duct. Instead, the average velocity of the air is determined and multiplied by the cross-sectional area of a plane across the duct. Since the velocity of air varies significantly over such a cross-sectional plane, an average velocity must be determined by measuring many different locations in the cross-sectional plane, and then averaging those values. The industry has derived standards for the locations to be measured, that are specified in terms of the distance from the duct walls.

A technician first measures the length and width of a rectangular duct, or the diameter of a round duct, and calculates the cross-sectional area, adjusting for the thickness of the duct walls and any insulation or other internal obstructions. Then he consults a table provided by an engineering society such as ASHRAE for the locations of the points in a matrix on the duct cross-sectional plane. The technician drills holes in the duct to allow the Pitot tube to be positioned at the each point in the matrix. It is convenient to think about horizontal and vertical planes across the duct. The technician marks his probe with tape so he can see how far into the duct to insert it to reach each traverse point. Then he makes a velocity measurement at each traverse point, one after the other, recording or storing each reading as he goes. In most cases it is necessary to measure between 16 and 150 different traverse points. This is a laborious and error-prone operation.

During a duct velocity traverse, a technician stands high on a ladder with his head in the dark space above the ceiling tiles. With traditional equipment, he holds a meter in one hand and a velocity probe such as a Pitot tube in the other hand. Between the meter and the Pitot tube are rubber hoses that dangle down and are prone to getting caught on projections. The hoses are also prone to swinging during measurement, which can affect the accuracy of the measurement.

A proper velocity measurement also requires determining the air density. Density in turn requires barometric air pressure, temperature, and if possible, humidity. Barometric pressure is easily measured inside the meter and is not a problem. Temperature and humidity present another problem for a technician. Already burdened by meter, probe, and dangling tubes, he must manipulate a temperature probe from the meter into the duct and keep it lodged there while performing the 16 to 150 separate velocity measurements mentioned above.

Once the velocity traverse has been completed and the Pitot tube withdrawn from the duct, a technician performs a separate setup to prepare to measure duct static pressure. A traditional meter must be removed from a Pitot velocity mode and placed into a differential pressure measurement mode. Then the user changes the hose connections between the Pitot tube and the meter. Finally, the user reinserts the Pitot tube into the duct and performs the static pressure measurement.

In summary, the airflow, velocity, temperature, and pressure measurements required are difficult and time consuming to obtain using traditional instruments and methods. Such a measurement process may require three different duct insertions, three different measurement modes on the meter, and two different hose configurations. The bulky meter may weigh a few pounds, and the user may have difficulty manipulating it with one hand to press the control keys while manipulating the Pitot tube with the other hand and keeping the tubes and temperature probe from swinging and getting tangled.

DESCRIPTION OF RELATED ART

Existing Products and Technologies Recently some wireless meters have appeared (e.g., Testo) eliminating the conventional coiled cable between the probe and the main body of the meter. However, one hand is still necessary to hold the meter, and another is required to hold the sensing probe. The sensing probes are still as large and ungainly as conventional instruments. They can be placed and left on a desk or file cabinet or floor, but are difficult to place at the point of interest for HVAC technicians, such as slotted air diffusers or water pipes.

Another type of wireless device has been used in HVAC applications. This is a wireless sensor network for datalogging, collecting environmental data at regular intervals. For example, at intervals of 10 seconds or one minute, a sensor makes a measurement and transmits it wirelessly to a stationary data collection and storage point. Once in a while the collected and stored data can be loaded onto a computer for analysis. The network data collector's memory is erased and a new set of data collection begins. This type of system is used to monitor buildings and factories. An example of this type of instrument is Wizard from Dickson. While useful for some tasks, the system has drawbacks. It requires a personal computer to display the results, so it is cumbersome to move around a building. The sensor modules are shaped for mounting on a desk or file cabinet or other flat place, but are not convenient for air diffusers and pipes.

In a quite different industry, medical monitoring of vital signs, wearable wireless instruments have appeared. These collect measurements such as blood pressure or pulse rate and wirelessly transmit the results to a nearby data collector or to the wrist of the user. From there results can be viewed or sent to a monitoring system for review or alarm. A related module might sound an alarm to the person wearing the sensors to alert them to excessively high blood pressure or similar problem. However, this type of instrument is not useful for finding and fixing HVAC problems, because it does not provide for remote sensors measuring environmental conditions.

Another interesting wireless application is wrist-mounted displays for runners and other athletes that show data from sensors mounted in their shoes or on their bodies to provide a measure of their performance. These systems lack remote sensors that measure environmental parameters, as well as other features that are applicable to HVAC and other industrial applications.

Problem Summary

To summarize the general problems with traditional instruments and methods, they limit the productivity of technicians by being heavy, cumbersome, by not measuring all of the required parameters simultaneously, by restricting the availability of measurement data among team members, and by forcing repeated movement between the points of cause and effect. Measurement procedures take much longer than desirable. Time is wasted. These problems lead to short cuts by technicians, which in turn product inaccurate or misleading measurements that have little credibility among industry peers.

Accordingly, improved apparatus, methods, and systems for measurement of environmental parameters are desired.

SUMMARY

The present implementation generally relates to an apparatus, system. and methods for measuring environmental characteristics of fluids, such as air and water. While the ways in which the implementation address the various drawbacks of the prior art are addressed in more detail below, in general. The apparatus, system, and methods provide means and methods for collecting desired environmental measurements from many locations and conveniently presenting the desired measurement results in real time.

In accordance with various exemplary implementations, a system for wireless measurements includes a variety of sensors to make in-situ measurements and transmit the results to the user where they are displayed and stored. e.g. via wearable modules, to free the hands of the user to make control adjustments and deal with tools.

In accordance with various exemplary implementations, the present implementation provides a system including applications-specific wireless sensing modules for accurate, in-situ measurement of building parameters, and wearable instrument components for real-time access via visual display and/or audible words, by technicians for beneficial use at the location of adjustment and control. The present implementation is an instrumental ion system of distributed modules with various functions. Each module may be specially designed for a specific I-NAC-related measurement function. Communication between modules may be via wire and/or RF wireless.

Unexpected benefits are derived from distributing the functional aspects of a measurement system to the location where they are best performed. Sensing and measurement may be done on a continuous schedule at the point of interest, in-situ, and does not burden the technician after placement. Results arrive regularly to a location where a technician can easily view it and act on it. Different results from different locations are presented together to improve understanding of the environment and quicker technician actions. Results are shared among all team members for optimum efficiency, and team members may communicate via the optional integrated walkie-talkie feature.

Improvements include better safety, reduced technician time, better accuracy, and less expensive instrumentation.

Exemplary system communication and control modules include:
Control
Display
Head mount display
Head mount audio
Thumbswitch
Repeater
Computer/PDA interface
Web access
Sensor modules include the following types:
Temperature types for air, water, and surfaces.
Humidity types.
Pressure types for air.
Pressure types for water
Air velocity
Airflow
CO concentration
CO2 concentration
Light intensity
RPM for fans/motors
Inclinometers for damper vane position/angle
Instrument interface modules provide interfaces to existing instruments and sensors such as electric utility meters and ultrasonic flow meters using one or more of these methods:
Digital communication stream
Pulse counter
Analog 4-20 mA current loop.
Analog voltage 0-5 v and 0-10 v.
The present implementation includes this new apparatus:
Light-weight capture hood.
The present implementation includes these improved methods:
Adjustment of dampers for adequate ventilation.
Adjustment of duct static pressure setpoint.
Duct velocity traverse.
Water-side balancing.
Adjustment of Room-to-Room pressures.
Proportional balance.

The present implementation provides a technician with freedom of movement while viewing measurement data on his wrist. He can see the result of his adjustments in real time and store measurement values while moving around.

A display format is provided to compare and contrast two or more different measurements from different locations. A personal computer may serve as a control module with an appropriate communication module plugged into its port.

The present implementation allows multiple team members to share measurement results via a wearable module, which promotes better teamwork and higher productivity. Optional walkie-talkie's are built into the control modules to provide voice communication via the same communication method used for measurement data.

These system capabilities make possible new, better methods for industrial repairs and adjustments. For instance, they eliminate the back-and-forth nature of many industrial operations where the point of interest is different from the point of control. Instead of a long cycle measurement/adjustment/measurement/etc., a real-time stream of measurements is available at the point where the adjustment is being made, saving time and facilitating a more precise final result.

The distributed nature of the instrument in the present implementation makes it possible for a technician to make the necessary measurements at the location of interest, transmit the measurements quickly to the location where they are most needed for decisions and adjustments, which may be a few feet or hundreds of feet away. The measurement results can be displayed on a wrist-mounted module, a head mounted module for heads-up viewing, or annunciated in the user's ear. The user's hands during this process are free for tasks instead of being occupied by instruments.

Various embodiments of the present implementation combine two operating modes that were previously only available in different instruments. One is a diagnostic or debugging mode used by a technician to promptly discover and fix problems. The other is a monitoring or data logging mode which collects measurements regularly from distributed sensors over a period of hours, days, or weeks. The data is analyzed later, usually plotted against time to show relationships between events. A related and unique capability is that the present implementation allows a mobile module to display the results in a diagnostic mode from sensors that are also at the same time part of a data logging network.

The present implementation also makes existing instruments more useful in several ways. Each result may be sent from the location of measurement to the location where an adjustment is necessary. The control module provides a very large memory for storing measurements and provides statistics that are often missing in other instruments. Measurements may be stored and compared along the same timeline as measurements from different instruments. The measurement data can be shared by multiple technicians in real time.

Sensor modules are sensing instrument probes that measure environmental parameters such as temperature, humidity, and pressure. Sensor modules are provided in accordance with various aspects of the present implementation.

Exemplary sensor modules include handles and means of attachment to industrial equipment so they do not have to be held by a technician when readings are being taken. Each of the sensor modules is designed to be small and easy to handle and be placed at a particular point of interest where the best accuracy can be obtained, and they can then be left, in-situ, performing continuous measurements that are sent to the technician wirelessly. They are designed to dramatically speed up a particular type of measurement and improve accuracy. They are designed to overcome the problems inherent in current industry practice as described above.

BRIEF DESCRIPTION OF THE DRAWINGS

Implementations will hereinafter be described in conjunction with the appended drawings, where like designations denote like elements, and:

FIGS. 5A, 5B, 5C illustrate the use of repeater modules for extending the usable system range in accordance with exemplary implementations;

FIGS. 7A, 7B illustrate an application for a system of temperature and humidity modules in accordance with exemplary implementations;

FIGS. 8A, 8B, 8C, 8D, 8E, 8F, 8G illustrate a multitude of measurement result display formats in accordance with exemplary implementations;

FIGS. 9A, 9B, 9C, 9D, 9E illustrate some types of temperature modules in accordance with exemplary implementations;

FIGS. 10A, 10B, 10C, 10D illustrate humidity sensor modules in accordance with exemplary implementations;

FIGS. 11A, 11B, 11C, 11D illustrate differential air pressure sensors in accordance with exemplary implementations;

FIG. 15 illustrates a variety of informational displays in accordance with exemplary implementations;

FIG. 19 illustrates air measurement in accordance with exemplary implementations;

FIGS. 20A, 20B, 20C illustrate sensor modules and instrument interface modules in accordance with exemplary implementations;

It will be appreciated that elements in the figures are illustrated for simplicity and clarity and have not necessarily been drawn to scale. For example, the dimensions of some of the elements in the figures may be exaggerated relative to other elements to help to improve understanding of illustrated implementations.

DESCRIPTION

This disclosure, its aspects and implementations, are not limited to the specific components, assembly procedures or method elements disclosed herein. Many additional components, assembly procedures and/or method elements known in the art consistent with the intended wireless sensors system will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such wireless sensors systems, and implementing components and methods, consistent with the intended operation and methods.

The apparatus, system, and methods of the present disclosure may be used for a variety of applications in HVAC, safety, lighting, and security systems in buildings and factories, including such applications as duct static pressure adjustment, airflow damper adjustment, room-to-room pressure adjustments, water side HVAC balancing, HVAC coil efficiency measurements, and the like. Included are measurements for immediate use as well as datalogging measurements at regular intervals over an extended period of time. As set forth in more detail below, the exemplary system and methods are generally easier to use, less time consuming, and require fewer and less expensive instruments compared to traditional systems and methods that provide similar functions.

Figure 1:
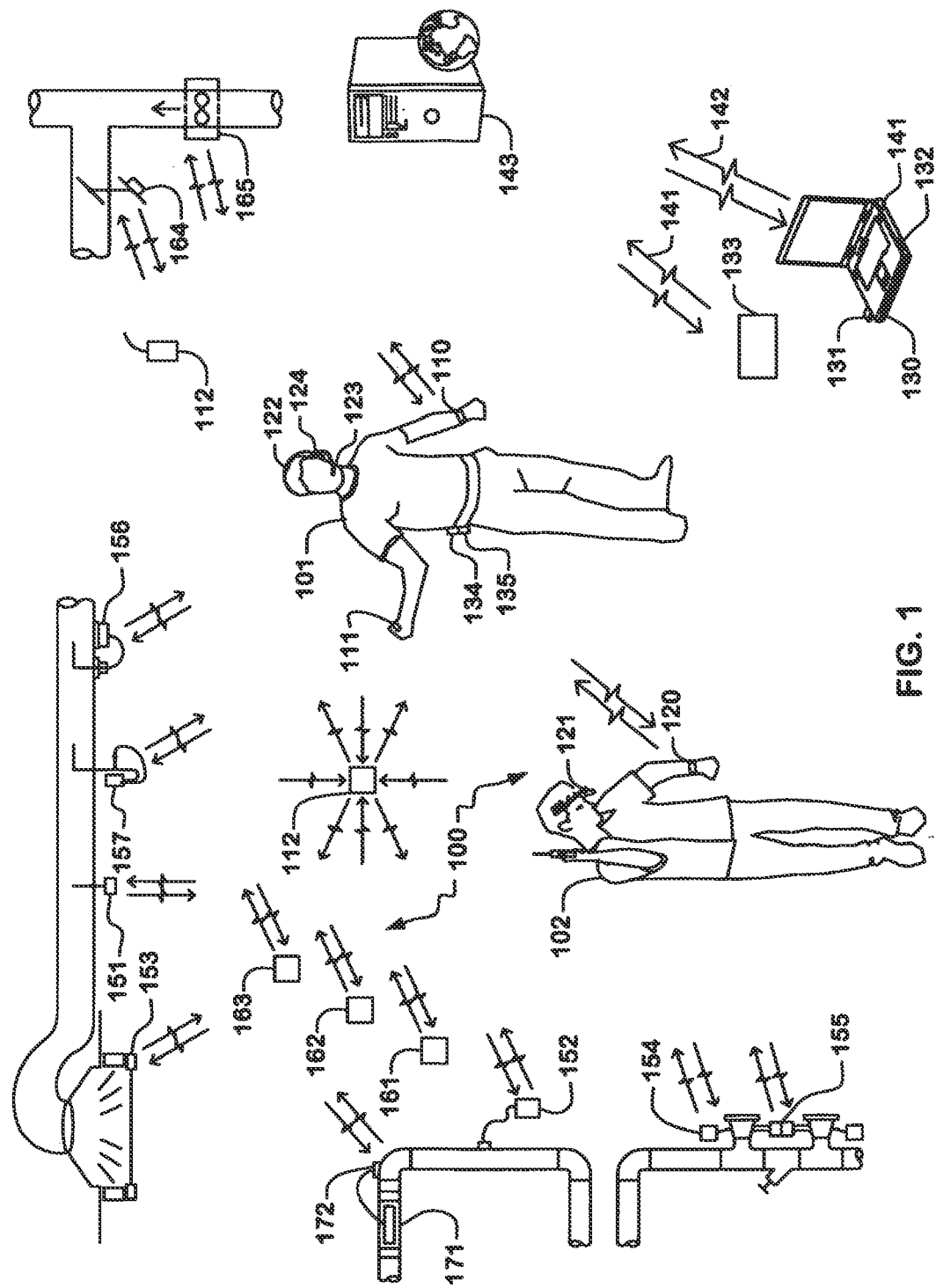
FIG. 1 illustrates the system form in accordance with exemplary implementations.

FIG. 1 illustrates a system 100 in accordance with exemplary aspects of various implementations. System 100 includes modules of various types for measuring environmental parameters, and then viewing, storing, and sharing the measurement results. The modules of system 100 have wired and/or wireless means of communicating information, commands, and measurement results. Illustrated system 100 includes control module 110, optional repeater module 112, optional sensor interface module 172, and a multitude of sensor modules described below, one or more of which may optionally be present in system 100. Illustrated system 100 also includes means for enhancing the usability of control module 110, including wrist display module 120, head-mounted display 121, audio module 122, thumbswitch 111, computer interface 131, PDA interface 134, and cellular data module 133. Use of system 100 improves user productivity in many ways, including: by allowing users to take measurements while using their hands for other tasks; allowing users to compare results from multiple locations concurrently; eliminating back-and-forth motion for repetitive measurements, facilitating information sharing among coworkers; easier set-up for complex and cumbersome measurements; facilitating more accurate results by maintaining measurement probes in-situ at the location of interest.

Users may include team leader 101 and associate 102. Users 101 and 102 may have placed one or more sensor modules 151, 152, 153, 154, 155, 156, 157, 161, 162, 163, 164, 165 in particular locations to make specific measurements required for industrial operations. Measurement results from sensor modules 151, 152, 153, 154, 155, 156, 157, 161, 162, 163, 164, 165 are transmitted to control module 110. The various implementations may include interface module 172, which may connect to an existing data output port of flow meter 171, if present. Interface module 172 may transmit measurements wirelessly to control module 110.

Control module 110 establishes and maintains the network by which all system modules communicate. Control module 110 may also have other functions, including display and storage of measurement data. Repeater module 112 has the function of a wireless signal repeater. Repeater module 112 is optional in system 100. When the distance between modules becomes too great for effective wireless transmission, repeater module 112 may be placed midway between the modules to allow signals to "hop". Signals from the transmitter are first received by repeater module 112, which in turn transmits over the now reduced distance to the receiver.

Control module 110 is operated via keys, buttons, and/or switches on control module 110. Control module 110 may also execute certain commands which are entered by user 101 via buttons, keys, or switches on thumbswitch module 111. Control module 110 may also execute certain commands which are entered by user 101 via microphone 123 on audio module 122. The ability to input commands verbally or via thumb movements allows user 101 to use his hands for something else while still making and/or storing measurements.

Also important to productivity is the ability to see or hear results without the need to use hands or arms. Control module 110 on user 101 may transmit information, including measurement results, to wrist display module 120 on user 102, and/or heads-up display module 121, and/or audio earphones 124 on audio module 122. Time and effort are saved by the ability of users 101 and 102 to both see the same measurement results at the same time despite their different locations. Other activities, including using hands for equipment repair and/or adjustment, may proceed while measurement results continue to arrive in real time.

Voice communication between team members in different locations may improve productivity. Control module 110 on user 101 and display module 120 on user 102 may include microphones and speakers and the software and hardware means to transmit voice via the same RF waves that communicate measurement results. This may eliminate the need to communicate information or instructions by walking to conference, by walkie-talkie instruments, or by cell phones. Headphone module 122 on user 101, with microphone 123 and earphones 124, may also be used to for voice communication, with transmission controlled by control module 110.

Productivity may be improved when information can be reviewed from a great distance. For example, a manager at a home office may be able to detect an HVAC problem by viewing measurement results at a remote location in real-time, and promptly give appropriate instructions. Building commissioners often share measurement information with colleagues across the country to compare results from similar buildings. System 100 provides means for transmission of information to remote servers 143, which may be accessed via the Internet. One way is for the control module 110 to transmit to cellular data module 133, which in turn has a connection 141 through the cellular telephone system to a remote server. A second way is for control module 110 to transmit to computer 130 via i/o module 131. Computer 130 may be directly connected to the Internet via a cable 141 or via a WiFi connection 142, both of which offer means of transmitting information from system of modules 100 to a remote server for world-wide viewing. A third way of storing information at one or more remote servers is via a PDA 135 controlled by user 101. Data may be collected by PDA 135. Once stored in PDA 135, information may be transmitted to a remote server via WiFi or via the cellular data network.

Module Components and Design Features

Exemplary electronic modules of various implementation include electronic assemblies built from customized printed circuit boards with microprocessor-based control circuits. The modules may be in relatively small enclosures of an appropriate size and shape for a specific system function. Enclosures may be a standard product purchased from a supplier such as TEKO, or may be built to a custom design. Holes in the enclosures may be drilled to provide access for connectors, keypad, display, and mounting means such as a strap.

The contents of system 100 modules may include one or more of these electronic hardware and software feature sets:
- embedded controller for general functions within a module.
- LED's and/or other display devices and related display control.
- Sensing electronics for analog or digital inputs.
- Keypad and On/Off switch and other switches, keys, or buttons.
- Battery and/or transformer.
- Audio electronics, microphone, speaker(s), drivers.
- Connectors for power, signals.
- Wired signal transmission drivers and protocols.
- Wireless transmission drivers and protocols, including RF point-to-point, RF multipoint, RF ZigBee, Bluetooth, WiFi, GPRS and/or other cellular data protocol.
- Antenna(s) appropriate for the extant protocols and frequency channel.

System 100 may include a wireless sensor network (WSN). WSN's are established using standard hardware and software, included in every node of the network. For example, a ZigBit is a communications component supplied by Atmel with related software for installation in multiple modules. The modules then have the capability to create and maintain a WSN based on the ZigBee Alliance protocol, which is an open standard. ZigBee uses an international standard 802. 15.4 protocol and standard ISM frequency ranges.

Figures 2A, 2B:
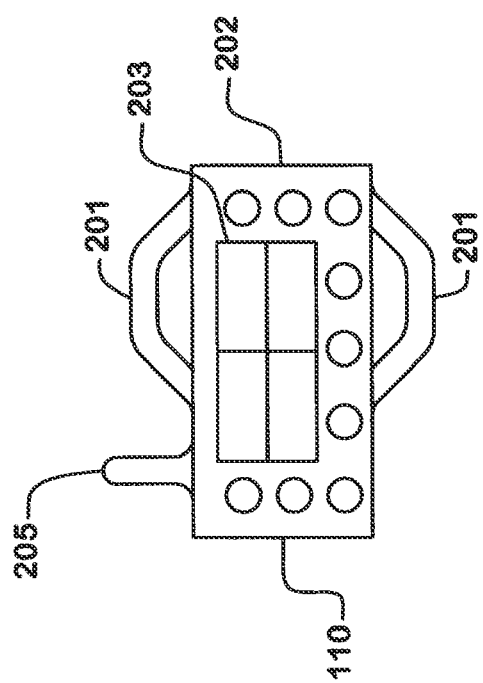
FIGS. 2A and 2B illustrate the wearable control module in accordance with exemplary implementations.

FIGS. 2A, 2B illustrate an exemplary wearable control module 110. Loops 201 support a wrist strap 204 or a spring bracket for mounting on other convenient apparatus. Control module 110 may also be mounted via magnets, Velcro, tape, or other means to an HVAC duct, pipe, rod, wire, cable, or other structure where convenient for the user. Keypad 202 may be used to control the display, storage of measurement results in memory with time and date, and the network. Antenna 205 may be a relatively long or relatively short dipole antenna that protrudes from the enclosure, or it may be another type of antenna installed internal to the enclosure. Connectors 206 may be electrical ports for communication and/or power. Display 203 can show the results from multiple sensors from multiple locations. A variety of display formats are provided for specific applications, allowing the user to compare and contrast different conditions in different locations. Real-time feedback from adjustments of environmental controls is very beneficial to productivity.

System 100 includes operating modes that were previously only available in different instruments. Control module 110 may operate in a diagnostic or debugging mode to discover and promptly fix problems. Control module 110 may also be used as a datalogger, collecting measurements regularly from multiple distributed sensors over a period of hours, days, or weeks. The data may analyzed, for example by plotting the information against time to show relationships between events. Control module 110 can operate in the debug mode or the datalogging mode or both at the same time. Two control modules 110 can operate at the same time in the same network, one operating in debug mode and one in datalogging mode.

Multiple control modules 110 can operate in the same environment with different sets of network modules. Unique addresses prevent communication between the different networks.

Control Module Display Formats

Control module 110 includes the ability to display information in a wide variety of formats, depending on the desires of the user. Control module 110 includes means for displaying and storing measurement results from multiple sensor modules from multiple locations. FIG. 8A, 8B, 8C, 8D, 8E, 8F, 8G illustrate some of the formats available to users. Other display formats may be configured for specific measurement applications, as discussed below. In FIG. 8A, large characters facilitate viewing from a distance. In FIG. 8B, a current reading is displayed in large characters at the upper left, while smaller characters at the right list the three prior readings. This gives an indication of the trend of the parameter. In FIG. 8C, a current reading is displayed in large characters at the upper left. At the lower left are shown the current memory group selected, AA, and the sequence number of the last value stored, 123. On the right are listed statistics for the current memory group AA, average, maximum, and minimum. In FIG. 8D, results from two different temperature sensor modules, S1 and S2, are displayed side-by-side. In FIG. 8E, results from two different sensor modules are displayed side-by-side. This type of sensor module supplies both a temperature and a relative humidity. The user can therefore compare four concurrent measurements from two different locations. In FIG. 8F, concurrent results are displayed from four different sensors in four different locations. Sensor module S1 is measuring temperature in degrees Fahrenheit. S2 is measuring barometric pressure in inches of mercury, S3 is measuring percent relative humidity, and S4 is measuring differential air pressure in inches of water column. In FIG. 8G, a list of datalogged measurements is shown with columns for record number, sensor number, time of record, value, and units. The date of the reading is displayed above.

Control Module Construction

Control module 110 may have a keypad 202 that is a membrane switch assembly as illustrated in FIG. 2. Control module 110 may be powered by a rechargeable lithium-Ion or lithium-polymer battery, which is recharged through a mini-USB port.

Control module 110 may have an LCD display with LED backlight for good visibility in dark environments, embedded controller, memories, real-time clock, audio codec, speaker, microphone, connectors, keypad, and other electronic components. Control module 110 displays the results which are received wirelessly at specified intervals from various sensor modules. Control module 110 may have a provision for storing measurements by pressing a key. Control module 110 manages the wireless and or wired communications of system 100. The various implementations include programmed features to tailor the network to the environment of field users, who may not be trained in networking. Features included for network durability and practicality in industrial environments include displays of status and problem alerts, and a "heartbeat" system in which each module regularly reports its status to control module 110.

Control module 110 may use anATMega256 microcontroller by Atmel, but other similar microcontrollers, either 8-, 16-, or 32-bit, could have been chosen. Standard C programming techniques were used to produce the controlling program, using standard development software from, for example, Atmel. The microcontroller of control module 110 performs these functions:
- manages power-on and power-off sequences
- monitors the keypad for user inputs, the real-time clock, and the battery status
- feeds data and text to the display
- transfers data to and from the wireless network module
- manages the audio codec
- manages the mini-USB port for recharging the battery
- manages the mini-USB port for transmissions to and from a fixed or mobile computer.
- manages the WiFi or other wireless port for transmissions to and from a fixed or mobile computer.
- manages the wired or wireless port for transmissions to and from the Web Access Module.
- manages the SD data port for storing data on a tiny SD-format memory disk.

Alternate Implementations

Control module 110 features may be implemented by a PDA or smartphone or mobile computer to which is attached a network control module.

Thumbswitch Module

Figure 3:
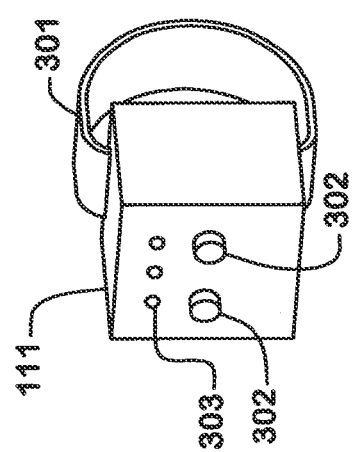
FIG. 3 illustrates the thumbswitch in accordance with exemplary implementations.

FIG. 3 illustrates thumbswitch 111, an optional module in system 100, which can be worn on a finger via stretchable fabric loop 301. If the user is holding tools or otherwise can't move his arm to touch the keypad of wearable control module 110 of FIG. 2A, he can effect a subset of keypress commands by pressing one or more buttons 302 on the thumbswitch as illustrated in FIG. 3. Examples of commands executed by wearable control module 110 but initiated via thumbswitch buttons 302 include storing a reading and changing a display format. One or more status indicators 303 may be present. Thumb switch 111 may fit in different places on different fingers, giving a user the flexibility to hold tools of different shapes while maintaining the ability to press buttons 302. Wearable thumb switch 111, together with wearable control module 110, and sensor modules that measure in-situ and need not be held, allow users the freedom to perform tasks with their hands while measuring and monitoring the environment.

Optional Modules for Disseminating Information

Figure 4A:
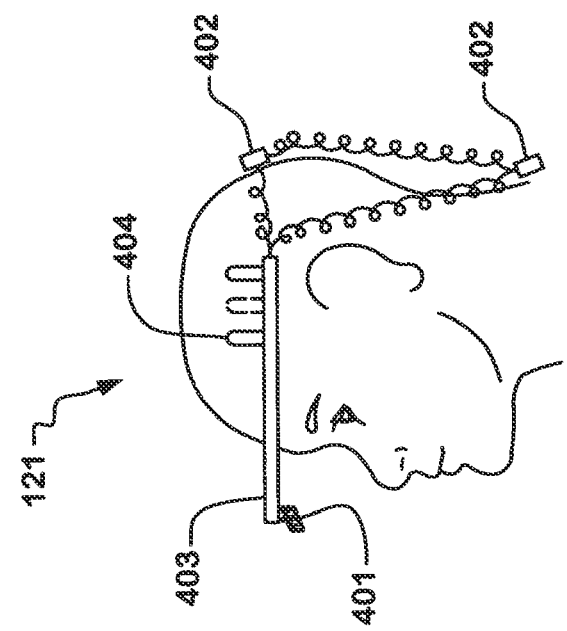
FIGS. 4A, 4B, 4C illustrate head-mountable communication in accordance with exemplary implementations.
Figure 4B:
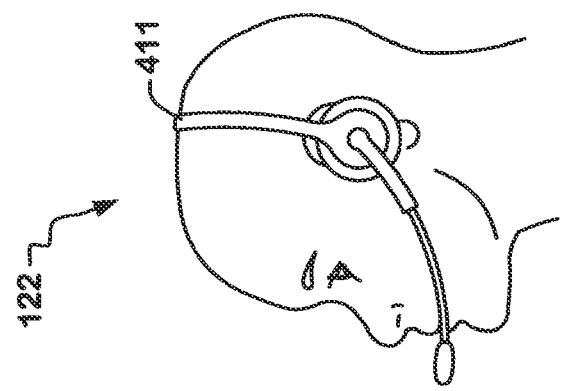
Figure 4C:
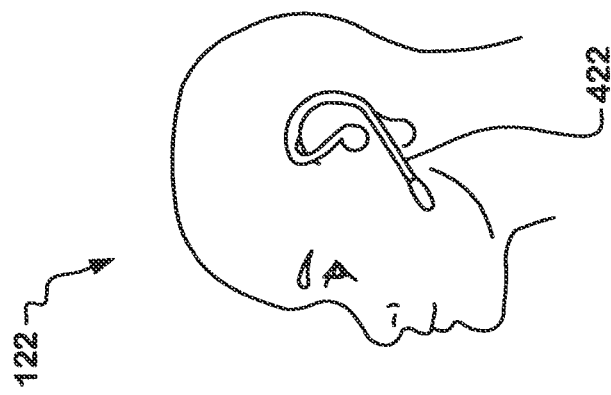

FIGS. 4A, 4B, and 4C illustrate head-mountable communication and control apparatus. FIG. 4A illustrates some exemplary details of head-mountable display module 121 from FIG. 1. Small display 401 is positioned in similar fashion to rear-view mirrors worn by bicyclists. Clamp 404 grips a cap, and supports small rod 403, from which display 401 is suspended. Images may be provided by module 402, which may be optionally attached to the back of a cap, attached to the back of a collar, placed in a breast pocket, or placed in some other location. Communication with control module 110 may be wired or wireless.

FIG. 4B illustrates exemplary details of audio module 122 from FIG. 1. Headphone and microphone arrangement 411 provide audio content such as measurement results and verbal messages from coworkers. Spoken commands may control module 110. FIG. 4C illustrates exemplary detail of audio module 122 from FIG. 1. Common ear bud 422 may use Bluetooth or WiFi or other protocol for communication with control module 110.

The electronics of head-mounted modules 121 and 122 may be battery powered. Alternatively, the battery in control module 110 in FIG. 1 and FIG. 2 may feed the other components via a wire. Alternatively batteries may be integrated with the audio and/or video electronics modules, or external batteries may be located in a module worn on the user's belt, in his shirt pocket, clipped to the back of his shirt collar, or clipped to the back of his ball cap or helmet. Commands, measurement results, and information may be transmitted from module to module via wire or via wireless RF.

Optional Repeater Module

Remote sensor modules may communicate with a control module in a variety of ways. Some of these are illustrated in FIGS. 5A, 5B, and 5C. FIG. 5A illustrates a sensor module 511 in wireless communication with control module 110 from FIG. 1 and FIGS. 2A, 2B. Control module 110 maintains a record of a unique identification number for sensor module 151. Wireless communication parameters such as signal strength and frequency are managed cooperatively by integrated hardware and software. Sensor module 151 makes regular measurements and transmits results to control module 110. Control module 110 can display the results for the user without storing them, or the user may cause the results to be stored with the value, units, sensor ID, time, and date. The user may cause the results to be stored without viewing them. The user may change the schedule of measurement. When sensor module 151 is not measuring or transmitting, it may put most of its electronic components into a sleep mode which uses very little power, such that a battery in sensor module 151 may have a relatively long useful life.

As illustrated in FIG. 5B, the user may require that sensor module 151 be placed at such a distance from control module 110 that wireless signals are too weak to maintain effective communication. In this situation control module 110 will display an alert to the user, who may then deploy repeater module 112 at a location somewhere between sensor module 151 and control module 110. Repeater module will be at an effective distance to receive transmissions of information from sensor module 151 and will retransmit said information, which control module 110 is near enough to properly receive.

FIG. 5C illustrates that multiple repeater modules 112 may be used to extend the effective range between sensor module 151 and control module 110. FIG. 5C also illustrates that control module 110 may maintain communication with multiple sensor modules at the same time, included some that are in direct communication, as well as those whose messages are being repeated.

Figures 6A, 6B:
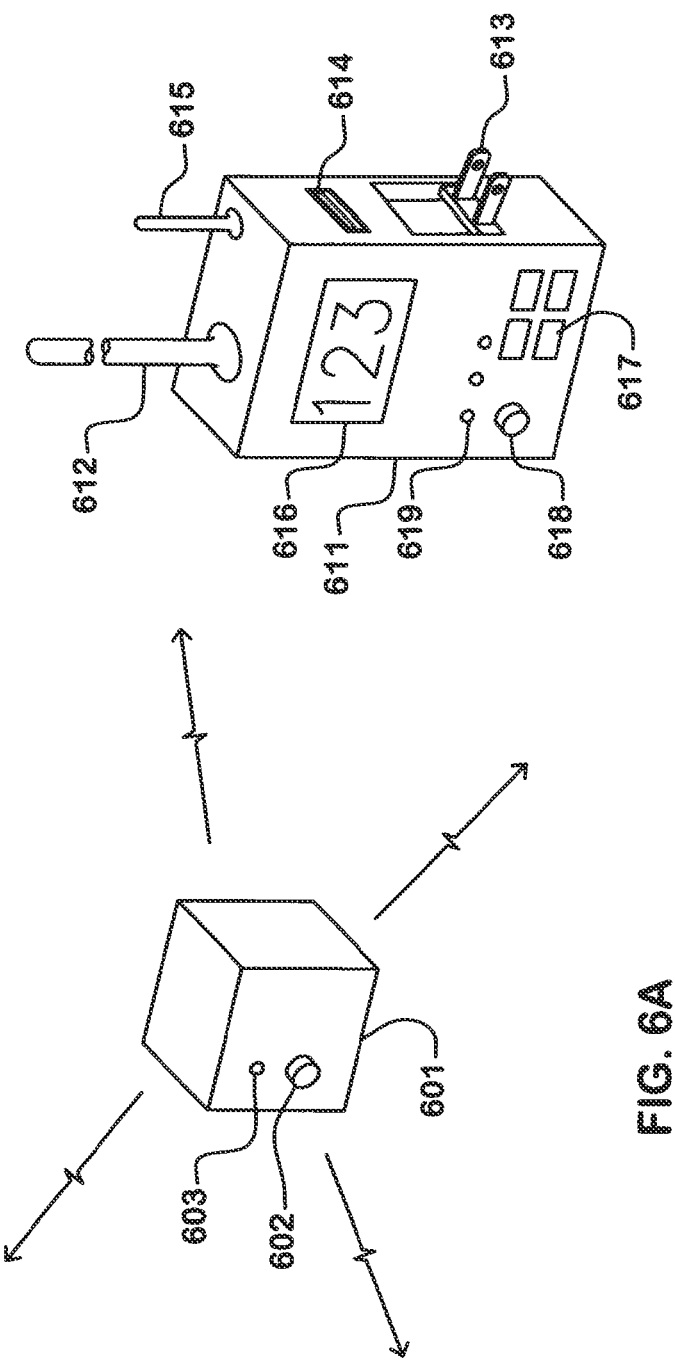
FIGS. 6A, 6B illustrate repeater modules in accordance with exemplary implementations.

FIGS. 6A and 6B illustrate two exemplary configurations for repeater modules. In FIG. 6A, repeater module 601 includes an On/Off switch 602 and one or more indicator lights 603. Repeater module 601 includes a relatively small battery and a relatively small antenna, with a correspondingly short range, relatively speaking. In FIG. 6B, repeater module 611 includes a large antenna 612 with a correspondingly longer range, relatively speaking. A large battery is included, as well as a transformer and wall electrical outlet prongs 613 for recharging the battery and/or operating while attached to mains power. A port 614 is included for attaching a cable for information transfer and/or powering from an external battery, solar panel, or other power source. A sensor 615 is included to allow repeater module 611 to measure and transmit environmental conditions from its immediate area, in addition to performing its function as repeater. A display 616 is included so a user may view status and other information. Buttons and/or keys and/or switches 617 are included to allow setup and manipulation of included functions, in addition to On/Off switch 618 and indicators 619.

Sensor Modules-Common

Sensor modules are sensing instrument probes that measure environmental parameters such as temperature, humidity, and pressure. The various implementations include many different types of sensor modules to address a multitude of HVAC applications. One or more sensor modules may optionally be present in an operating system 100. The various implementations offer a common platform for users and reduces the number of different instruments required for HVAC applications, saving money and time.

FIG. 1 illustrates a multitude of sensor modules attached to various HVAC fixtures where users may require measurements for solving problems and/or adjusting equipment. For example, sensor modules 151, 152, and 153 are placed in different locations of interest. Sensor module 151 has a shaft type of sensing probe that penetrates a small hole in an air duct and measures temperature. Sensor module 152 has a button shape for measuring the surface temperature of, e.g., water pipes. Sensor module 153 measures temperature and humidity, and has a shape and features to allow users to easily attach it to, e.g., air supply ceiling diffusers. Sensor modules 151, 152, and 153, like other sensor modules in the various implementations described below, may be designed to be relatively small and easy to place at a particular point of interest in HVAC applications. Sensor modules may be designed to remain at the point of interest, in-situ, and continue measuring and transmitting results to a location convenient to the user. Sensor modules may have unique handles and means of attachment to industrial equipment so they do not have to be held by a technician when readings are being taken. When using sensor modules instead of traditional handheld meters, users need not make repeated trips to a point of interest for follow-up measurements.

As illustrated in FIG. 1, sensor modules 151-157, 161-165 may be placed in or on air ducts, air diffusers, water pipes, condenser coils, walls, floors, ceilings, desktops, or many other places in buildings and factories. It is the combination of size, shape, accessories (magnets, rings, clips, Velcro, adhesive dots, etc.), and the convenient communications link, usually wireless, to the Control Module 110, that make the sensor modules of the various implementations uniquely suitable for industrial measurement applications. When used in a system 100, sensor modules 151, 152, and 153, as well as other sensor modules described below, reduce the time required for industrial procedures and improve accuracy and safety.

System 100 may include wireless sensor modules for these HVAC applications:

Insertion air temperature.
Surface temperature.
Average temperature of ducts and mixing chambers.
Insertion humidity probe.
Fluid pressure and temperature in pipes.
Differential Water Pressure Sensor Module
Differential air pressure module with unique door mount.
Velocity Sensor Module.
Airflow probe for inlets and outlets.
Other sensor modules for CO2 concentration, CO concentration, light intensity, inclinometer, motor/fan rotor speed in RPM, switch status (open/closed).

System 100 of FIG. 1 includes instrument interface module 172 which allow existing meters and sensors to be interfaced to control module 110:

Instrument interface for instruments which have digital output ports, such as these instruments popular in HVAC applications: Shortridge AirData Multimeter™ series; TSI/Alnor EBT 720 series; Kanomax Climomaster A5xx series; other instruments with digital outputs.

Instrument interface for third-party instruments and sensors which feature standard analog outputs formats: 4-20 mA; O-to-5 volts; O-to-10 volts.

Sensor Module Construction

Sensor modules, including sensor modules 151-156 and 161-165, may include: a custom printed circuit board, one or more status LED's, sensor or sensor connector, battery, communication circuitry. One or more microcontrollers are programmed to control the LED indicator(s), power on and power-off sequences, battery power monitoring, and sensor interface. Sensor modules may use primary or rechargeable batteries, and may also provide means for mains power and/or external battery power. Sensor modules include means for attaching to key locations of interest and remain in-situ while delivering a stream of regular measurements.

Temperature Sensor Module

FIGS. 9A, 9B, 9C, 9D, 9E illustrate a temperature sensor module 901, including a sensing and radio electronics part 902 and a connected sensing probe 911 or 912 or 913. Sensor probe 911 has a sensing element 921 at the end of a stiff shaft. Sensor probe 912 has a flexible lead attached to a button-style sensing bulb 922. Sensor probe 913, for applications that require the average temperature in a space, has a thermally-conductive lead in which are located one or more temperature sensor elements 923. Each sensing probe 911, 912, and 913 may be connected to sensor module 901. Sensor module 901 includes an On/Off switch and one or more LED's or displays. Sensor module 901 may include magnet 931 and/or magnet 932 applied to one or more facets of the module for attaching to ferrous surfaces. Facet 933 has a surface appropriate for taping sensor module 901 to a non-ferrous surface. Ring 934 allows clipping or hanging from lines or pipes or other available structure.

FIG. 7A illustrates some applications of a temperature sensing elements shown in FIGS. 9A, 9B, 9C, 9D, 9E. Illustrated is a simplified model of an HVAC system serving part of a building. One sensor module 901 with sensor probe 911 sits on a table at location 701 to measure room temperature. Another sensor module 901 with sensor probe 911 uses a magnet 931 to attach to ferrous fixtures at ceiling locations 702 and 703. Location 702 represents supply air temperature entering room 708, while location 703 measures the temperature of room air as it passes through a return air grille and enters a return air duct. A sensor of type 901 at location 709 measures return air temperature and another at location 710 measures fresh outside air being brought in to ventilate the building and replace stale air. In mixed air chamber 713, two air streams collide in a turbulent environment, where temperature probe 913, is used to measure the average air temperature. The mixed air exits through filter 714. Fan 715 propels the air past coil 716 and into the supply air duct. The temperature of the water in the coil pipe is approximated by the sensing probe 912, with button-style sensing bulb 922 which is held against the pipe with tape or strap. Ring 934 shown in FIG. 9A provides means to hang the sensor module 901 near the location to be measured 718.

Method for Measuring Mixed Air Proportions

HVAC industry rules require a certain amount of fresh outside air for each square foot of occupied space. An air balancer must supply just enough, but not too much, outside air. Dampers 711 and 712, along with fan speeds, are varied to achieve the necessary outside air. Air balancers make a calculation to determine outside air volume by comparing the respective temperatures of supply air, return air, outside air, and mixed air. Industry practice is to measure each location (709, 710, 713, 706), then adjust the dampers, then measure again, repeating this cycle until the required relationships of temperatures are achieved. This is an iterative process that is time consuming. The various implementations allow sensors to be placed as described above. As better seen in FIG. 7B, module 110 provides four continuous readings from four different locations in the format shown in FIG. 7B: return air temperature 721, outside air temperature 722, mixed air temperature 723, and supply air temperature 724 (after being cooled by coil 716). With this improved method, the required adjustments can be made relatively quickly, reducing manpower and shortening schedules.

In accordance with additional implementations, a method of measuring mixed air proportions includes the steps of:
  Deploy temperature sensor in the air mixing chamber;
  deploy temperature sensor in the outside air duct;
  deploy temperature sensor in the return air duct;
  deploy temperature sensor in the supply air duct;
  display results from four sensor modules concurrently on control module 110;
  calculate the proportion of supply air that is outside air;
  calculate the outside air volume;
  calculate the desired outside air volume based on occupancy, usage type, etc.;
  compare the actual outside air volume to the desired outside air volume;
  adjust outside air damper and return air damper while observing the changes in measured air temperature on control module 110.

Traditional methods require many iterations of measurements, accompanied by a lot of back and forth movement. The ability to deploy sensor modules for continuous measurements saves a lot of time and effort. Also, because it is relatively easy to achieve a precise outcome, users are less likely to take shortcuts which may retain an undesirable level of outside air.

Humidity Sensor Module

FIGS. 10A, 10B illustrate exemplary configurations of humidity modules that are part of system 100. Sensor module 1001 includes sensing probe 1002, which can be used with or without extension rod 1003. The longer configuration is useful for placing the sensing element 1004 at a particular location in large ducts. Sensor module 1001 with sensing element 1004 measures temperature as well as humidity. FIG. 10C illustrates four different exemplary results available from one measurement: relative humidity percent 1011; dry bulb temperature 1012; wet bulb temperature 1013; dew point temperature 1014. Optional results not shown include grains of water per cubic foot. FIG. 10D illustrates exemplary displays from two humidity modules in different locations. A user may view for comparison these results: RH from S-1 1021; dry bulb temperature from S-1 1022; RH from S-2 1031; dry bulb temperature from S-2 1032.

Differential Air Pressure Sensor Module

FIGS. 11A, 11B, 11C, 11D illustrate an exemplary of a differential air pressure sensor module. FIG. 11A illustrates a version of the sensor module with two ports, and FIG. 11B illustrates a four-port version. The pressure between the ports is measured and transmitted to control module 110.

Air pressures are involved in a multitude of HVAC applications, including duct static pressure and velocity pressure. Duct static pressure is the difference between the pressure of duct air and room air. Velocity pressure is related to air velocity. It is measured as the difference between two types of orifices on the probe. FIG. 11C illustrates both of these measurements.

FIG. 11C illustrates differential pressure sensor module 1101 attached via included magnet 1113, shown in FIG. 11A, to the side of an air duct. An industry standard probe 1132, a static tip, is inserted through a hole in the wall of duct 1131 and oriented into the airstream such that the static pressure of the duct is present at probe output port 1134. A flexible hose is connected between port 1134 and sensor module port 1111. Sensor module port 1112 is exposed to ambient air. The sensor module then measures the difference between the pressure of the air in the duct and the pressure of the air outside the duct. The result, e.g., 1.25 inches of water column, is sent wirelessly to control module 110.

Also in FIG. 11C, differential pressure sensor module 1102, with four ports, is attached via included magnets to the side of air duct 1131. An industry standard probe 1141, a Pitot tube, is inserted through a hole in the wall of duct 1131 and oriented into the airstream. Pitot tube 1141 has two output ports, and there are two differential pressures typically of interest to users. Connected to the static pressure port is flexible hose 1142, which is connected to sensor module 1102 via ports 1121 and 1123. Another flexible hose 1143 is connected to sensor module 1102 port 1124. In this configuration, the sensor module transmits two results of interest to control module 110. Duct static pressure is the difference between sensor module ports 1121 and 1122. Velocity pressure is the difference between sensor module ports 1123 and 1124. Ports 1121, 1122, 1123, and 1124, for the sake of clarity, are respectively illustrated as ports 21, 22, 23, and 24 in FIG. 11C.

Differential pressure modules 1101 and 1102 are useful in several applications, including setting duct pressure, setting room-to-room pressure, setting occupied space pressure vs. outside air, fume hoods, biosafety cabinets, and others. Most commercial and industrial buildings are specified to have a slightly positive pressure to prevent ingress of outside air, humidity, leaves, and bugs (think restaurant dining areas). The pressure drop across filters is a key measure of the cleanliness of filters. Various implementations are designed to quickly and easily detect problems in these areas and alert a technician, building manager, or restaurant owner. various implementations provide results of pressure measurements from multiple locations to be reviewed and compared concurrently, which reduces the time involved in certain procedures. An exemplary application is described below.

Application: Measuring and Adjusting Room-to-Room Differential Pressures

Figure 13:
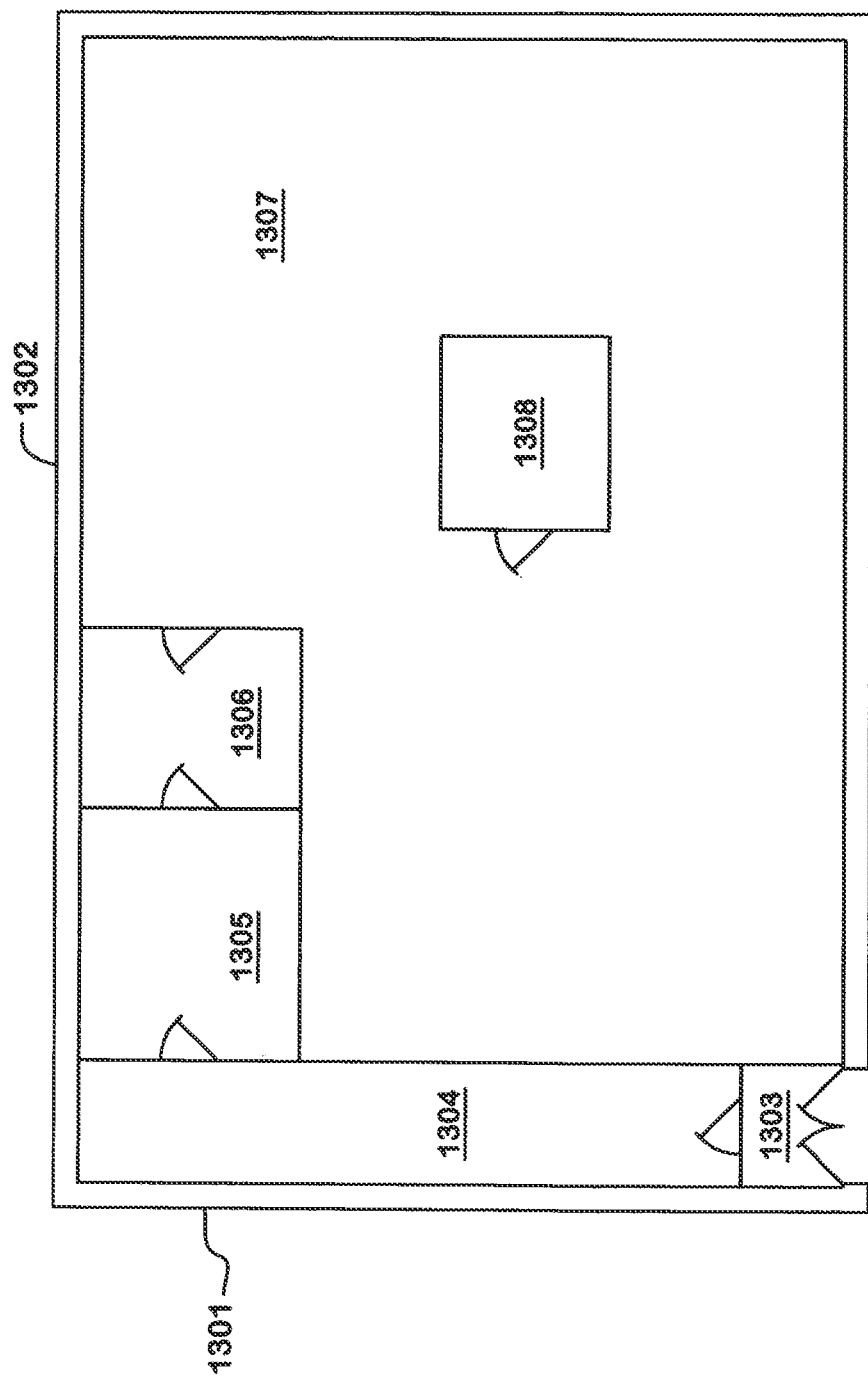
FIG. 13 illustrates areas of different pressures in a cleanroom.

The innovative capabilities of the various implementations are especially important for cleanroom applications such as semiconductors, pharmaceutical, and hospitals, where multiple related pressures are specified. FIG. 13 illustrates a wafer fabrication facility 1301 with outside walls 1302, an exterior entry 1303, corridor 1304, suit-up room 1305, air wash 1306, general operations area 1307, and mini-environment for special processes 1308. The requirement for air cleanliness depends on the nature of the area. Pressure differences are one of the primary methods of controlling the direction and degree of contaminant movement. That is, a space with a great need for cleanliness will be specified to have a higher pressure than adjacent areas. Typical room-to-room pressure differences are maintained between 0.03 inches of water column and 0.06 inches of water column. For the building illustrated in FIG. 13, there may be a specification for these pressure differences:

R1304 to 1303:0.02 in. wc.
R1305 to 1304:0.03 in. wc.
R1306 to 1305:0.04 in. wc.
R1307 to 1306:0.05 in. wc.
R1308 to 1307:0.05 in. wc.

Pressure differences are created by adjusting fan speeds and dampers to adjust the volume of supply air and return air for each space. The fans and dampers may be located at quite some distance from the points being measured. The pressures are interrelated, so adjusting one fan or damper can affect two or more room-to-room pressures. A conventional differential pressure sensor, usually held near a door by a technician using two hands, can measure only one or two differential pressures at a time, and the result is nowhere near the point of control, the fan or damper. The user records the measurement, moves to the point of control, makes and adjustment, and returns to make another measurement. The HVAC system is often organized such that the room characteristics are interrelated. An adjustment of one fan may affect two or three rooms, causing rooms that were in spec to go out of spec. Then the process begins again. The current industry method involves a long, drawn-out series of measurements and adjustments. System 100 allows multiple sensors to be placed where necessary. The room-to-room pressure measurements are continuously transmitted wirelessly to the wrist of the technician, who can display and store two or more measurements at the same time. In most cleanroom buildings the technician has access to the control elements from an interstitial level above the cleanrooms themselves. With the information provided, he can quickly achieve all of the specified pressure set points, saving a lot of time and effort.

Method of Measuring Room-to-Room Pressures

In accordance with additional implementations, a method of achieving a desired set-point for duct static pressure includes the steps of:

deploy differential pressure sensor modules to each location of interest;
link each sensor module with the control module;
deploy repeater module(s) if necessary for increased range;
select an appropriate display format on control module;
observe differential pressure measurements in real time from a multitude of locations.

Current methodologies are of two types. One way is for one person to move sequentially to each location of interest, measuring and recording results, and often returning to repeat measurements to note changes. Another method is to deploy multiple operators, each with an expensive handheld instrument, who communicate by shouting, moving for conferences, via walkie-talkies, or via cell phones. The exemplary implementation clearly offers a dramatic improvement in productivity for this type of application through the use of distributed sensor modules that are relatively inexpensive, together with novel formats for measurement presentation that allow quick feedback on control changes and component interactions within HVAC systems.

Method for Setting Duct Static Pressure

In HVAC duct systems it is important to maintain a minimum level of pressure at the extreme end of the duct system in order to maintain airflow through the duct and diffusers. For instance, a building engineer might specify that the fan generate a duct pressure that is 3 inches of water column above the ambient pressure in the building (static pressure), and that the system of valves and dampers be adjusted such that the most remote air diffuser will be supplied air at a pressure of at least 0.5 inches of water column. It is critical that the pressure at this point be carefully controlled. If too low, the diffusers will not distribute conditioned air as designed and building comfort will suffer. If too high, energy is wasted by running the fan too fast. If the technician measures only 0.4 inches of static pressure, he needs to adjust the fan and/or the dampers to increase the remote duct pressure to the minimum of 0.5 specified. However, if the pressure is higher than required, the excess fan power will use far more electricity than it should. The electric power required increases at the cube of the duct pressure increase. For instance, if the fan speed is increased to raise the remote duct pressure to 0.55 inches, only 10% higher than required, the fan will use 30% more electric power than required. (The calculation has the form of 1.1×1.1×1.1=1.3.) Current procedure requires a technician to measure the pressure at the appropriate point in the duct, and then move through the building to adjust the fan and the dampers. He then returns to measure pressure again. This cycle of measurement and adjustment will be repeated until the specified result is achieved. Sometimes the fan is a long distance from the point being measured, and on a different floor. This repetitive procedure requires a lot of time and effort, and leads to the technician settling for some safe guard-banded pressure instead of achieving the precise result desired. This is one of the main sources of wasted energy in buildings. What the technician needs for applications like this is a stream of real time measurements taken at the point of interest and delivered to him where and when he is making the adjustment at the point of control.

Method

In accordance with additional implementations, a method of achieving a desired set-point for duct static pressure differential pressures concurrently includes the steps of:
deploy differential pressure sensor modules to the points of interest, which may include not just the end point of a duct, but several points throughout the duct system which may be affected by a control change;
link each sensor module to the control module;
deploy repeater modules if necessary for range;
select a useful display format;
observe existing status of duct system pressures;
effect changes in fan speed or damper settings;
observe static pressure responses to control changes in real time from multiple locations.

Pipe Fluid Pressures and Temperatures

Figure 12:
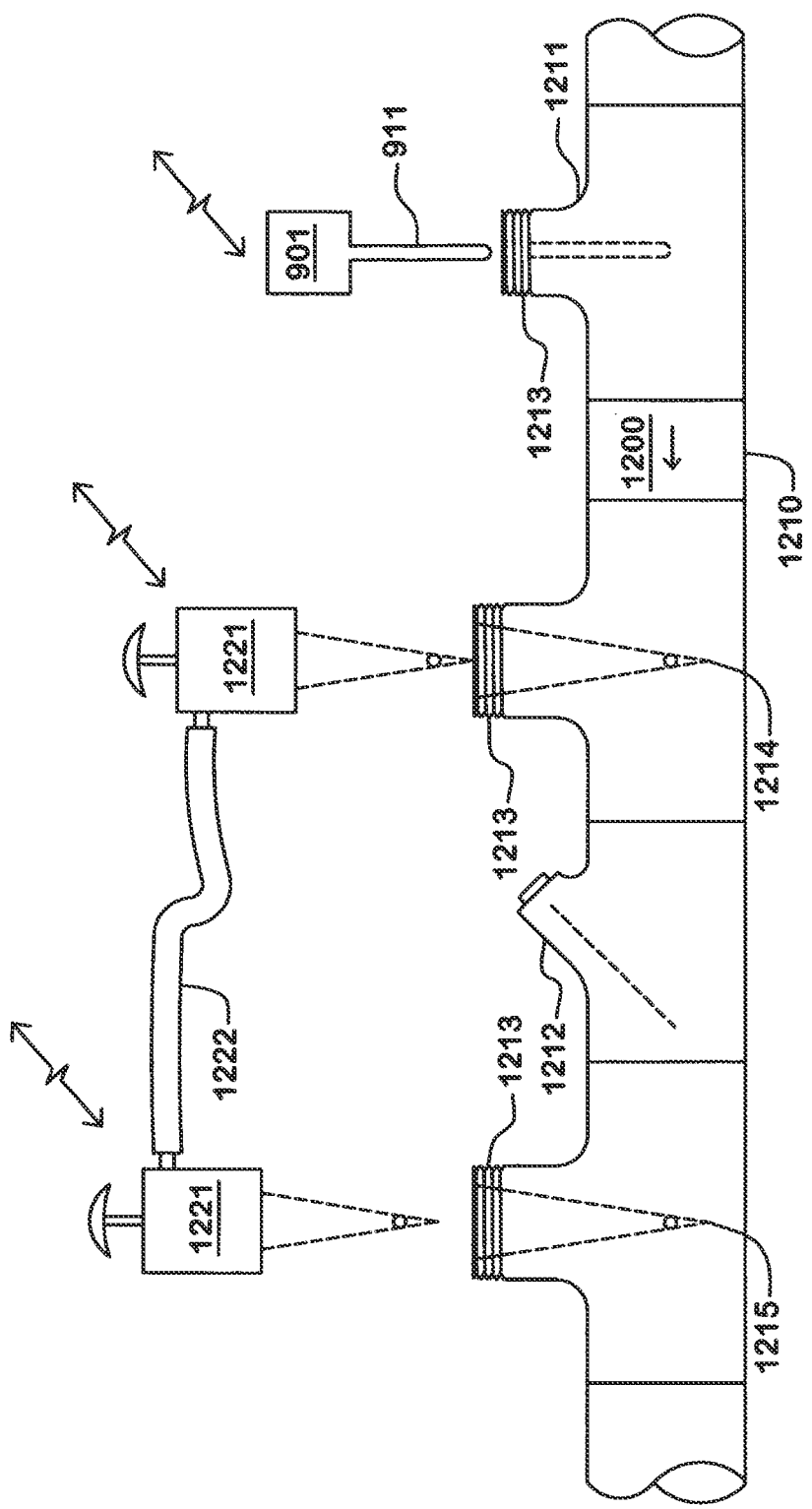
FIG. 12 illustrates measurement of water pressure and temperature in accordance with exemplary implementations.

System 100 utilizes sensor modules to measure temperature and pressure of fluids in pipes. FIG. 12 illustrates the use of sensor modules in an exemplary application. Fluid 1200, e.g., water, moves through pipe 1210. Pipe 1210 includes three fixtures known as PT test points (pressure and temperature), which are sometimes implemented using a water-tight access port 1213 called a Pete's Plug. If temperature alone is desired, sensor module 901 from FIG. 9, or a similar sensor module, may be inserted through a Pete's Plug as illustrated at location 1211. Temperature measurements will be transmitted continuously to control module 110.

If pressure is desired as well as temperature, sensor module 1221 may be inserted through a Pete's Plug as illustrated at location 1214. Sensor module 1221 allows pressure measurements to be made through the Pete's Plug. Control module 110 can display multiple pressure and temperature results from multiple locations concurrently.

Valve 1212 may be adjusted to control the flow of fluid, and a user may desire to know the volumetric fluid flow. Valve 1212 may be calibrated so if the pressure drop across the valve is known, the volumetric flow, e.g., in gallons per minute, can be determined from a chart or equation. Sensor module 1221 can measure the differential pressure between locations 1214 and 1215 as well as the static pressures at each point. All results are transmitted to control module 110. It is often desirable to have these results available concurrently. It is also often desirable to have these results available from multiple locations concurrently.

Method

In accordance with additional implementations, a method of measuring pressure and/or temperatures at a multitude of points in a pipe system concurrently includes the steps of:
deploy pressure and temperature sensor modules to each point of interest;
if desired, deploy water flow meter with connected instrument interface module;
link each sensor and interface module to the control module;
deploy repeater modules if necessary for range;
select a useful display format;
observe existing status of system pressures and temperatures;
effect changes in pump speed or valve settings;
observe multiple responses to control changes in real time from multiple locations in a user-friendly display format.

Velocity Sensor Module and Probe Apparatus

Air velocity is frequently required in HVAC. Various implementations include a velocity sensor module with unique features. A velocity sensor module, in coordination with temperature and/or humidity modules and a control module, form a system of distributed sensors that allows a user to make velocity and pressure measurements in air ducts more rapidly, more conveniently, more accurately, and more safely. Various implementations may also be used to measure air velocity and pressure in applications other than ducts. Various implementations may use a method based on differential air pressure, which is applicable to traditional velocity probes such as Pitot tubes.

A widely used formula for air velocity is derived from fundamental laws of physics:

$$V=(1096.7)\sqrt{VP/d}$$

where V is velocity in feet per minute, VP is velocity pressure in inches of water column and d is density of air in pounds per cubic foot which=(1.325) BP/T where BP is barometric pressure in inches of mercury, and T is absolute temperature which=degrees Fahrenheit+460.

Figure 14:
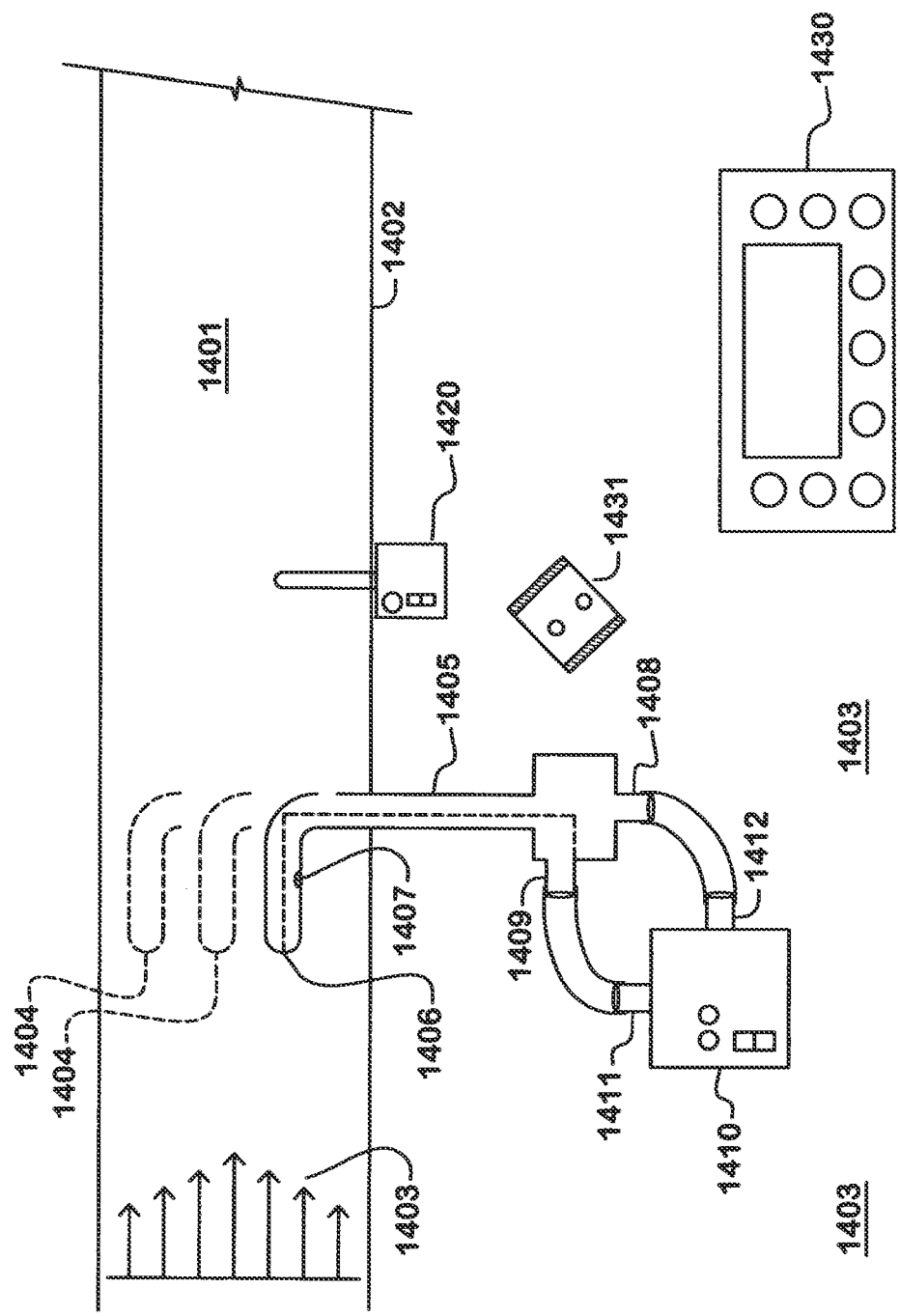
FIG. 14 illustrates a system of duct air sensors in accordance with exemplary implementations.

FIG. 14 illustrates a system 1403 for making measurements of T, BP, and VP of duct air in an air duct. Often these measurements are part of a standard procedure, a velocity traverse of a duct. This procedure determines the conditions at a cross-sectional plane of a duct. Air conditions include barometric pressure, temperature and optionally humidity. Air conditions also include static pressure at one or more points on the cross-section. Conditions also include the inside dimensions of the duct, free of any insulation that may coat the duct walls. From these dimensions, a user consults standard tables and/or formulas to determine the matrix of points in the duct cross-section at which velocity must be measured. Air velocity is not uniform in the cross-sectional plane, so many measurements must be performed at different locations and the results averaged. The average velocity times the cross-sectional area equals the airflow volume at that point in the duct system.

FIG. 14 illustrates a duct traverse procedure using an exemplary implementation. Air or another gas flows through duct 1401 with duct walls 1402. Air velocity is not uniform across the duct as illustrated by velocity vectors 1403. The user must determine an average velocity in the duct by making and storing many measurements at specific locations 1404 located in the cross-sectional plane of the duct 1401. A user holds Pitot tube 1405 steady at each location 1404, and makes and stores a velocity reading. Then the user moves the Pitot tube to the next location for another measurement. Industry standard procedures may require measurements at 16 or more, sometimes as many as 200, separate locations in the duct.

A Pitot tube 1405 has an orifice 1406 at the tip which when facing into the airstream develops total pressure. A Pitot tube has at least one other orifice 1407 that develops static pressure if not directly impacted by the passing airstream. A Pitot tube includes separate channels to conduct the two pressures outside the duct where they may be connected by hoses to velocity sensing module 1410. One hose connects the static pressure port 1409 of Pitot tube 1405 to the static pressure port 1411 on velocity sensing module 1410. Another hose connects total pressure port 1408 on Pitot tube 1405 to total pressure port 1412 on velocity sensing module 1410.

Velocity sensing module 1410 includes valves, sensors, microprocessors, and other components to accurately measure total pressure, velocity pressure, and static pressure concurrently. The measured values are transmitted to control module 1430. Sensor module 1420 is inserted through a hole in duct wall 1402 and remains in-situ measuring temperature and/or humidity. The measured values are transmitted to control module 1430, which calculates and displays all of the results of interest to the user. Control module 1430 may be worn on the user's wrist, or mounted to the duct wall 1402, or otherwise placed conveniently. The user may store measurements by reaching to press the keypad of control module 1430. Alternatively, the user may store results and perform other control functions by pressing buttons on thumbswitch 1431. Stored results are "stamped" with the associated time and date. The user may choose from a variety of display formats, which are illustrated in FIG. 15. Various implementations include means for providing key information of different types to the operator concurrently to save set-up and measurement time and to improve understanding of the environment. Key among those innovative information displays are the concurrent measurements of velocity and static pressure.

Figure 16:
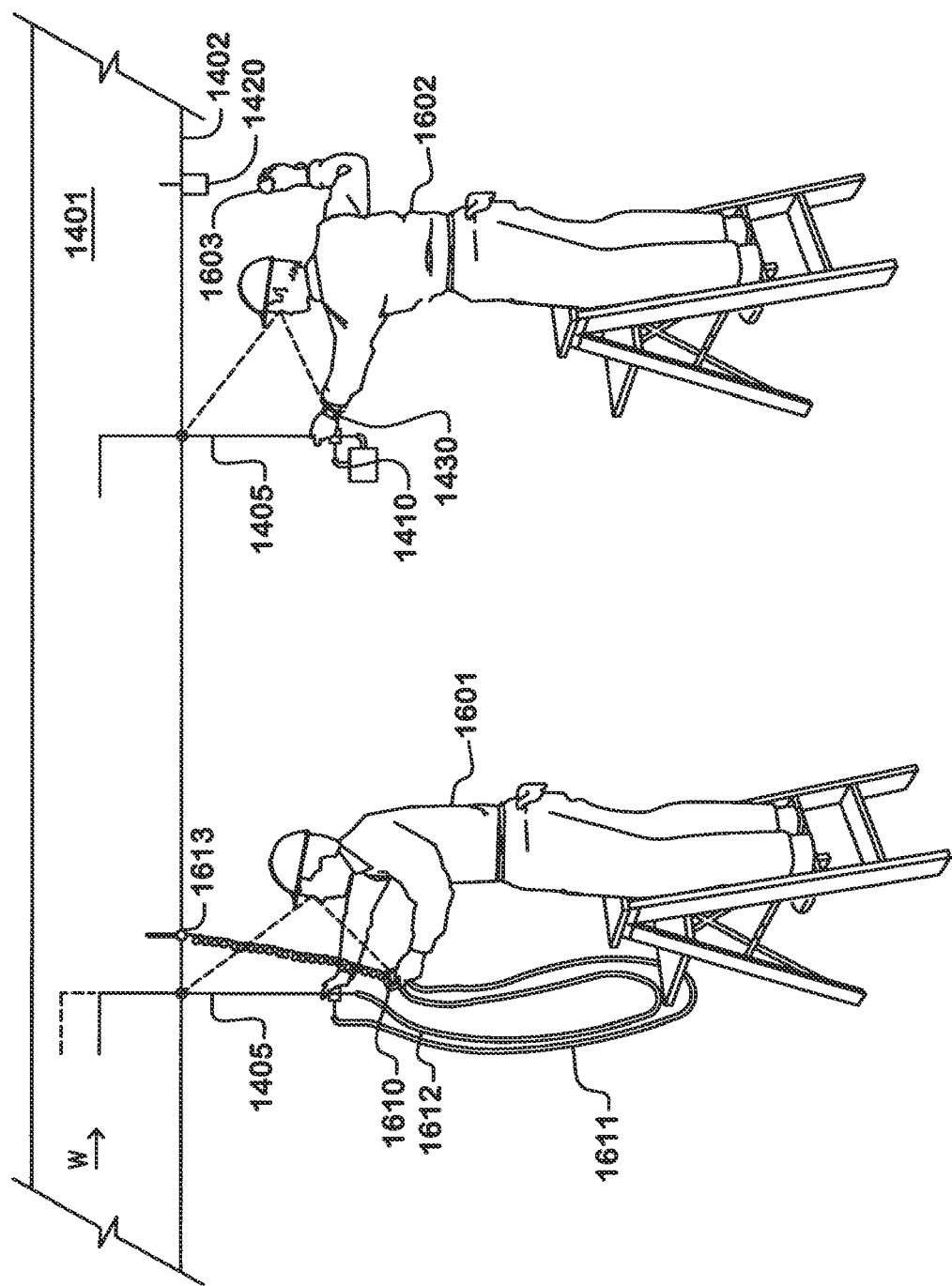
FIG. 16 illustrates duct air measurements in accordance with exemplary implementations.

FIG. 16 illustrates some improvements provided over traditional methods. User 1601 holds a traditional velocity meter 1610 in one hand and manipulates the keypad with his thumb. Tubes 1611 and 1612 loop down from Pitot tube 1405. Tube 1611 has gotten caught on ladder. When the tubes 1611 and 1612 dangle and swing, measurement result may be less accurate. Temperature sensor 1613 is inserted through duct wall 1402 and connected to meter 1610 with a coiled cable. User 1601 stands on a ladder with his head in a dark area above the ceiling tiles. User 1601 moves his head up and down alternately, first up to position Pitot tube 1405 for a measurement at a proper matrix point, then down to view and store the results on the meter. FIG. 16 illustrates the cumbersome nature of the velocity traverse procedure. It is not uncommon for users to simplify the process by skipping the temperature measurement, which affects accuracy.

When user 1601 finishes the velocity traverse matrix, he lacks a necessary measurement, static pressure. User 1601 withdraws Pitot tube 1405 and temperature sensor 1613 from the duct. User 1601 removes the temperature sensor. User 1601 disconnects tubes 1611 and 1612 from the meter. User 1601 replaces tube 1611 on the meter at a different port. User 1601 presses keys to change the meter mode from velocity to pressure. User 1601 reinserts Pitot tube 1605 into the duct and orients it into the airstream. User 1601 presses the meter to read and record the static pressure in the duct.

User 1602 in FIG. 16 uses system 1403. Velocity sensor 1410 is attached to Pitot tube 1405 with stiff tubing that does not move during a measurement. The display of control module 1430 and the position of Pitot tube 1405 are both visible to user 1602 without moving his head. No tubes dangle from Pitot tube 1405. No coiled cable is attached to temperature sensor 1420 to present an obstacle. User 1602 has one arm and hand free to grasp a nearby fixture 1603 for improved safety. Free of cumbersome tubes and cables, and provided more visible results, his motions are faster and more precise. When user 1602 finishes traversing the matrix, he may view all of the measurement results as illustrated by FIG. 15. No setup changes are necessary to obtain static pressure. Static pressure was measured concurrently with velocity and temperature. A special interactive display mode of the Control Module facilitates the measurement and provides a convenient display of the results. An element of the present implementation is the ability to display related measurements simultaneously when the technician usually requires the knowledge. An example in this case is Duct Static Pressure. FIG. 15 illustrates an exemplary implementation of a complete display of desired information.

Method of Measuring Duct Static Pressure

In accordance with additional implementations, a method of concurrently measuring temperature, velocity, and static pressure in an air duct includes the steps of:
- deploy insertion temperature sensor module to a suitable duct location;
- connect two pressure ports of a velocity sensor module to the static and total pressure ports of a Pitot tube or similar probe;
- link control module to temperature sensor and velocity pressure sensor;
- place Pitot tube inside an air duct at point of interest;
- multiple measurements of multiple types are received from multiple locations and displayed on control module for storage and/or dissemination and/or uploading to computer or Internet.

The various implementations are used with industry-standard Pitot tubes, which are available for purchase from Dwyer, Cole-Parmer, and other HVAC industrial supply companies. Pitot tubes vary in length from a few inches to five feet or more.

The Velocity Sensor Module will also support Static Pressure measurement with industry standard static pressure probes. Various implementations will support many other forms of velocity and pressure probes.

Alternate Implementations of Velocity Sensor Module

Sensor module 1410 may be firmly attached to Pitot tube 1405. Sensor module 1410 may have an enclosure that envelops part of Pitot tube 1405. Said enclosure may have a part that is shaped like a bicycle handle grip to enhance usability.

Air density is strongly affected by barometric pressure and temperature. Sensors for those two parameters are therefore necessary parts of an accurate velocity sensing system. The effect of humidity is less pronounced, so humidity sensors are not typically used in velocity measurement systems. The distributed and wireless nature of the various implementations make it easier for the user to utilize a humidity sensor and therefore achieve a higher than normal accuracy.

Airflow Sensor Module and Capture Hood Apparatus Airflow Sensor Module

Figure 17:
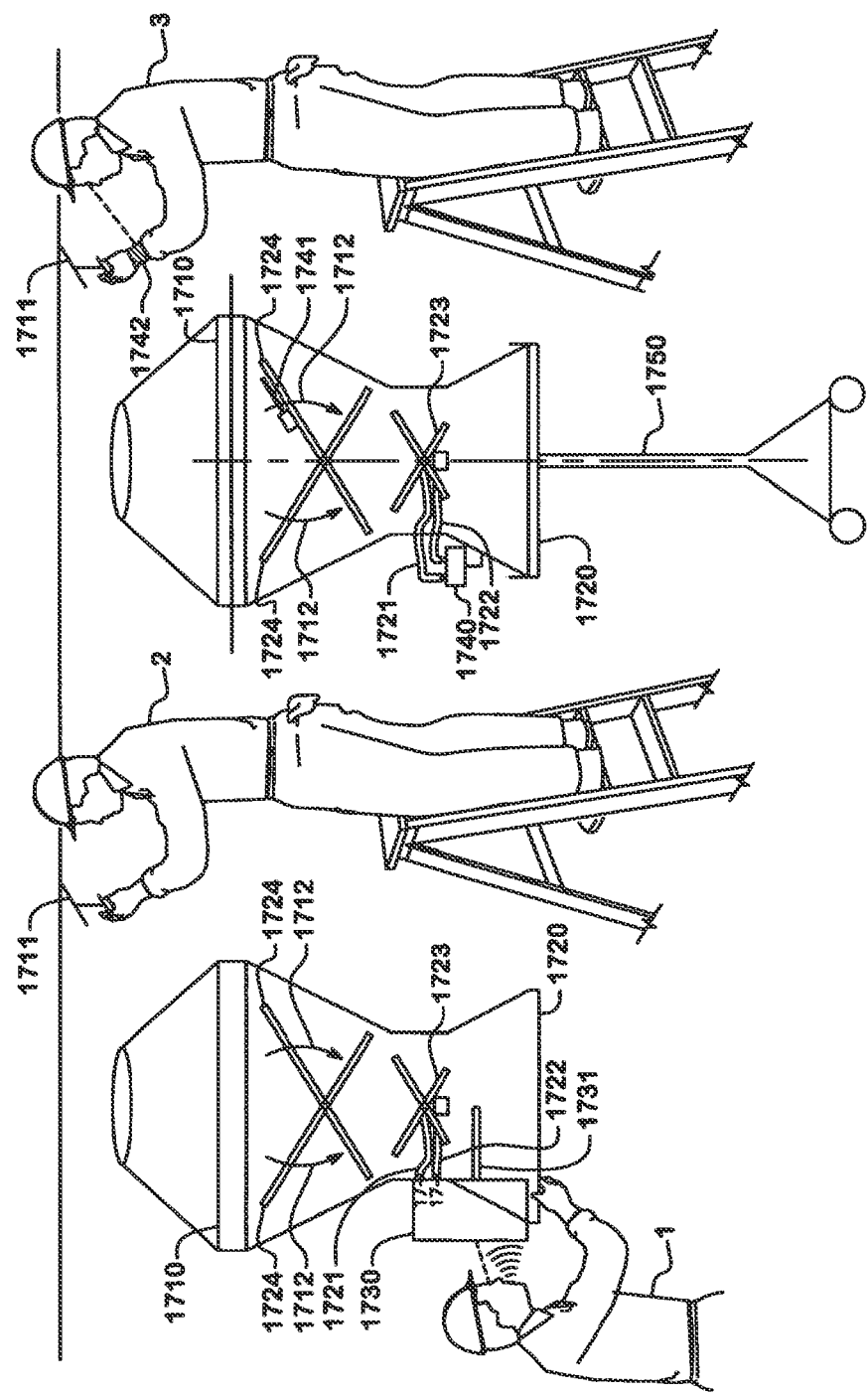
FIG. 17 illustrates air measurement and adjustment in accordance with exemplary implementations.

The various implementations comprise an airflow sensor module which is used with existing airflow capture hoods. FIG. 17 illustrates a damper setting procedure performed in two ways. Two rectangular ceiling diffusers 1710 are to have their airflow volume adjusted to meet the specification. Users 1 and 2 use a traditional capture hood and traditional method. User 1 holds a heavy, awkward capture hood tight against the ceiling fixture to try to capture all of the airflow, which flows across velocity grid 1723. Velocity grid 1723 works on a differential pressure principle similar to that of a Pitot tube. When airstream 1712 flows across velocity grid 1723, a pressure difference is generated between an upstream pressure in tube 1721 and a downstream pressure in tube 1722. These tubes are connected to positive and negative pressure ports on meter 1730. Meter 1730 measures the differential pressure and calculates a velocity. The meter then multiplies the calculated velocity by the cross-sectional area of capture hood 1720, and displays a volumetric airflow, e.g., 220 cubic feet per minute (CFM). User 1 sees the result and shouts it to his teammate user 2. User 2 is on a ladder to reach and adjust the damper that controls flow to ceiling diffuser 1710. After making an adjustment, user 2 waits for user 1 to shout a changed result. This iterative process repeats until the specified airflow is reached.

User 3 uses airflow sensor 1740. Airflow sensor 1740 performs the same measurement and calculation functions as meter 30, and transmits continuous results to control module 1742 on the wrist of user 3. As user 3 adjusts the damper, he sees the changed result in real-time.

The weight of airflow sensor module 1740 is a small fraction of the weight of meter 1730, because it is designed for a distributed sensing system, and needs no display, keypad, or other features that burden meter 1730. It is much easier to lift and place capture hood 1720 with airflow sensor module 1740 installed than for the same capture hood with meter 1730. This can be done by a human operator, or it can be done by a jack or stand 1750, which allows one person to perform a damper setting function normally performed by two people. A jack or stand 1750 could also be used with meter 1730, but user 2 would have to climb down the ladder once in a while to read the displayed result.

FIG. 17 illustrates another long-standing problem with traditional methods and illustrates a corresponding advantage of a distributed sensing system. As with Pitot tubes, airflow sensors must include air density in the calculation. However, temperature sensor 1731 is typically poorly designed and poorly positioned to contribute an accurate figure. It takes too long, e.g. up to three minutes, for airstream 1712 to heat or cool temperature sensor 1731 to the correct temperature. Most users cannot wait that long so they forego the temperature component and accept an inaccurate result. User 3 has installed a fast-acting temperature sensor on a support strut 1724 of capture hood 1720. It measurement of temperature is transmitted to control module 1742 and is included in the airflow calculation. Optional temperature features included with control module 1742 are to lock in a particular temperature measurement for use with all subsequent measurements, or to manually enter a known air temperature for use in subsequent airflow calculations.

Airflow sensor 1740 is far less expensive than meter 1730, allowing more widespread use.

Figure 18:
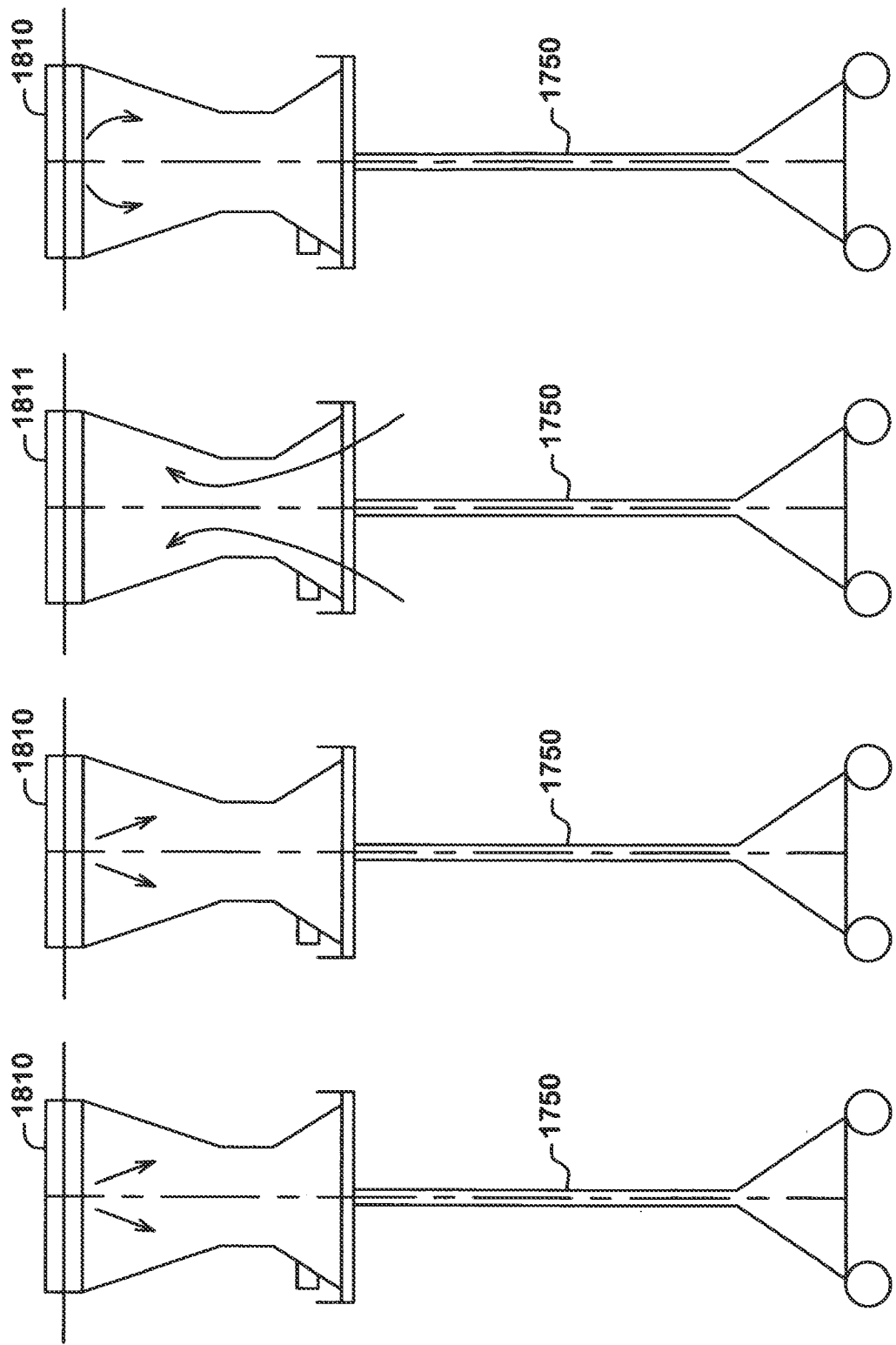
FIG. 18 illustrates air measurement in accordance with exemplary implementations.

FIG. 18 illustrates other unique benefits of the various implementations. A room has three supply air diffusers 1810 and one return air diffuser 1811. Jacks or stands 1750 hold four capture hoods in place. As shown in FIG. 17, one operator 3 can view the airflow figures for all four diffusers at the same time on one control module 1742. He can adjust the dampers of one after another without moving the capture hoods. Airflow volumes of diffusers on the same system are often interrelated. Adjusting one damper can cause changes of all four airflows, not just the one an operator is seeking to adjust. With traditional equipment and methods, many iterative measurements are required before each diffuser achieves the specified airflow. In the implementation, the interrelationships are revealed to the operator and corresponding adjustments can be made quickly, saving a lot of time. The ability to view multiple results concurrently offers an unexpected benefit for operators.

Airflow Capture Hood

A relatively small, lightweight capture hood is utilized for measuring airflow at inlets and outlets. Traditional capture hoods such as capture hood 1720 with meter 1730 in FIG. 17 weigh about 9 or 10 pounds. Replacing a traditional meter with airflow sensor module 1740 reduces the weight to about 7 pounds. Various implementations may include a capture hood 1901 shown in FIG. 19 that weighs about 3 pounds. Capture hood 1901 is constructed with the same type of aluminum, carbon fiber, and modem fabrics that are used in the construction of tents and clothing for mountain climbing. Capture hood 1901 is not constrained by the need for a mounting platform for a heavy meter. Capture hood 1901 utilizes a frame that is light and relatively flexible compared to traditional capture hoods. Capture hood 1901 comprises two or more optional locations for the airflow sensor 1740, on the side or beneath the velocity grid. Quick-responding temperature sensor or temperature and humidity sensor 1741 is attached to the upper frame of capture hood 1901 where it will have early contact with the airstream. Capture hood 1901 is affixed to the diffuser such that the operator can move away for adjustments or other measurements. These new methods are not practical for heavy capture hoods, but are practical for a hood weighing only three pounds. In one implementation, capture hood 1910 comprises a spring hook 1943 that hooks over a vane of diffuser 1710, and tension holds the light capture hood tightly against the diffuser. In another implementation, magnets 1944 around the perimeter of the capture hood attract to a ferrous strip around the ceiling diffuser. In a further implementation, spring clamps may hold capture hood 1901 tightly against the ceiling strips between tiles. Alternatively, a thin, lightweight extensible rod 1945 may be placed between the floor and capture hood 1901, pinning it against the ceiling diffuser.

Proportional Balancing

Proportional Balancing of HVAC Duct Systems was discussed above. There is often a need to observe and understand how the adjustment of one diffuser damper is affecting the airflow at the other diffusers in the same duct system. This can be done by propping up a capture hood at a diffuser and wirelessly monitoring it while adjusting other dampers.

Another way to monitor the change is to use a Pitot tube. It is often easier using magnets and grippers to position a Pitot tube in the duct leading to the diffuser in question than it is to jack up a capture hood against the ceiling diffuser. The Pitot tube can then wirelessly transmit a percentage change in measured velocity at a point in the duct cross-section that represents the total airflow. The important parameter is the percentage change caused by the damper adjustment, not the amount of airflow itself.

The Velocity Sensor Module of various implementations will make further improvements in the time and accuracy of Proportional Balancing. Using magnets or other holding apparatus, a Pitot tube can be temporarily fixed in place at the center line of the duct feeding the furthest duct, the reference duct, as mentioned above. The air velocity measured at that point can be correlated to the airflow measured through the diffuser. When an adjustment shows that an upstream duct adjustment caused a particular change in the duct velocity, such as 5%, it can be assumed that the airflow also changed by 5%, and an airflow measurement can be avoided. The final airflow can be measured at the diffuser as usual to verify the result, but the intermediate measurements can be avoided and much time saved.

Method

In accordance with additional implementations, a method of measuring at multitude of locations concurrently includes the steps of:
  deploy sensor modules to the points of interest, including airflow sensor modules on capture hoods, and/or velocity sensor modules on Pitot tubes or similar probes, air pressure sensors attached to duct static pressure sensing probes, and/or room-to-room pressure sensor modules, and/or other related sensor modules;
  link each sensor module to the control module;
  deploy repeater modules if necessary for range;
  select a useful display format;
  observe existing status of duct system at a multitude of locations;
  effect changes in fan speed or damper settings or other changes;
  observe duct system response in real time from multiple locations.

Other Sensor Modules

Various implementations comprise other sensor modules that measure light intensity, radiation, CO2 concentration, CO concentration, motor/fan rotor speed in RPM, degree of incline (for dampers and grille degree of openness), pulse counters (for electric meters and other types), and switches (for doors open/closed and machines on/off). Other sensor modules are constructed in a fashion similar to the temperature sensors of FIG. 9. Other sensor modules are illustrated in FIG. 20. In FIG. 20A, the sensor module 2001 may have a sensing element as an integral part of the module. Alternatively, a sensor module 2002 may have the sensing element 2020 located in a shaft-type of probe as in FIG. 20B. Alternatively, as illustrated in FIG. 20C, other sensor module may have a sensing element 2030 located at the end of a flexible cable.

Instrument Interface Module

Various implementations also make existing instruments more useful in several ways. First, the result is sent wirelessly to where it is needed. Second, the control module display and viewing angle will usually be superior. Third, the control module provides a very large memory for storing measurements and provides beneficial statistics that are often missing in other instruments. Fourth, the thumbswitch allows hands-free storage of measurements. Fifth, the measurement data can be shared by multiple technicians in real-time.

Digital Outputs

For instance, this type of Sensor Module can utilize the digital results from existing instruments such as the AirData Multimeter from Shortridge Instruments. This allows the benefits to be applied to the use of the third-party meter. Results can be sent wirelessly to a remote location, the user can view the results on his wrist while his hands are free for another operation, a large memory is available for storing data, and the Thumb switch allows him to store data without moving his arm. The Interface Module is adaptable to match the electrical and mechanical output of the third-party meter. The ADM-870C meter from Shortridge Instruments provides an RS-232C serial data output through a standard round connector.

Interface Module for Analog Outputs

Ultrasonic fluid flowmeters and other existing instruments, sensors, and transmitter have analog outputs such as 0-5 volt, 0-10 volt, and 4-20 mA current loop. This Module uses the same basic foundation as the Digital Interface Module, but includes circuitry to convert the analog measurement to a digital value for wireless transmission.

Pulse counters.

Open/close switches.

Instrument interface modules may have characteristics illustrated in FIG. 20C. Connector 2030 is designed specifically for the output of the instrument of interest. It is attached to the end of a flexible cable 2031 which carries signals to conversion and wireless circuitry inside module enclosure 2003.

Operation in Exemplary Applications

The modules (control, sensor, and, if present, thumb switch, repeater, and other types) are collected and turned on. They automatically join a wireless network and the control module displays a Link Status showing all of the modules in the network. The technician deploys each sensor module as appropriate to the function he is performing, such as temperature, humidity, pressure, etc. The technician strap the control Module to his wrist or otherwise positions it for easy viewing. At specific intervals, the measurements made by the sensor modules are radioed to the control module and displayed. The technician may store the measurements in memory if desired, either by pressing a key on the control module's keypad or by pressing a key on the thumbswitch.

The various implementations address the key deficiencies of other HVAC instruments as noted above. Measurements can be taken at the point of interest and results delivered to the technician for immediate action as necessary. What is delivered is a stream of real-time data, not one or two occasional measurements that represent a particular point in time. The technician's hands are free to make the physical changes necessary, such as repairs or adjustments. A team of technicians can wear modules and share the results in real time for improved team productivity. Further, an integrated walkie-talkie is available for team coordination.

The various implementations allow the technician to install a remote sensor, then move around the building to make the necessary adjustments while a stream of real-time measurements are radioed to him. Thus informed, the technician can make exactly the right adjustments to achieve a precise result. This saves a lot of time and gives a much better result.

The various implementations offer another advantage in that they can make existing instruments far more useful and productive. This is a uniqueness factor. An example is the AirData Multimeter from Shortridge. These instruments measure air pressure, temperature, velocity, and flow. Model 870C of this series of instruments has a serial output that can feed a stream of data to a wireless module which is a component in various implementations. The data is then distributed wirelessly to the wrists of the technician team members, who can quickly make the necessary HVAC adjustments. Following is one example of the power of this improvement. Current practice is for one person to hold up a capture hood to an air outlet in the ceiling while another person climbs a ladder, removes a ceiling tile, and locates the damper that controls the air flow to that diffuser. The meter on the capture hood displays the amount of air coming through the diffuser into the room in cubic feet per minute. The person holding up the heavy capture hood, with some difficulty because of the sight angles involved, then reads the meter's display and shouts it to his partner, who adjusts the damper accordingly, trying to achieve a specified result. Then the two repeat the procedure until the air flow is within the desired range. Finally, the one holding up the capture hood can lower the instrument and rest. Then the team moves to the next diffuser and repeats the procedure.

In the various implementations, the airflow data is collected from the Shortridge meter and wirelessly radioed to the control module where a continuous stream of readings is viewed directly by the technician adjusting the damper. He can adjust the damper smoothly and continuously until the result is precisely at the midpoint of the desired range. The one holding up the hood does not have to read the meter or shout to his teammate; he can concentrate on holding the hood steady. The result of the various implementations is a faster, more accurate result achieved with less effort and stress on the team. In many cases, the various implementations allow one person to do the same function, using a jack or prop to hold the hood in place. This type of measurement is performed very frequently, so reducing the manpower required by about 50%, while improving the accuracy of the results, is very important to the HVAC industry. Also, fast, accurate results help reduce the energy used in the building and contribute to the energy goals of the country.

These system capabilities make possible new, better methods for industrial repairs and adjustments. For instance, they eliminate the back-and-forth nature of many industrial operations where the point of interest is different from the point of control. Instead of a long cycle measurement/adjustment/measurement/etc., a real-time stream of measurements is available at the point where the adjustment is being made, saving time and facilitating a more precise final result.

The distributed nature of the instrument makes it possible for a technician to make the necessary measurements at the location of interest, transmit the measurements quickly to the location where they are most needed for decisions and adjustments, which may be a few feet or hundreds of feet away. The measurement results can be displayed on a wrist-mounted module, a headmounted module for heads-up viewing, or annunciated in the user's ear. The user's hands during this process are free for tasks instead of being occupied by instruments.

EXAMPLES

The TAB Accelerator Kit is composed of a Wrist Reporter, Dongle, and Thumbswitch. There are also accessory cables, batteries, and chargers. The Kit works in conjunction with the Shortridge AirData Multimeters, models 870C and 860C.

The Wrist Reporter is worn on the wrist of the user or otherwise placed convenient to viewing. Readings from the meter are sent wirelessly to the Wrist Reporter for viewing and storage. This allows the TAB technician to finish projects more quickly with more precise measurements.

Example: Climb a ladder, move the ceiling tile aside, and prepare to set the damper. Look down at your Wrist Reporter and see the flow readings changing in real time as you move the lever. When the reading matches your target, you mark the lever position and/or tighten the wing nut. You're done. No more shouting back and forth to your teammate holding the FlowHood. The Dongle takes the reading out of the Air Data Multimeter and transmits it wirelessly to the Wrist Reporter. Also, it doesn't matter that the viewing angle to the meter is difficult when the Flow Hood is overhead. The view that matters is the view of the Wrist Reporter.

Example: Cut 50% off the time required to perform a duct traverse by freeing your hands of the ADM and by seeing velocity statistics as you proceed. Prepare the duct and pitot tube or Airfoil as usual. Then place the ADM-870C in the correct measurement mode and set it to AUTO or TREND so it reads continuously. You no longer need to crane your head to see the meter's display. Hang it on your hip using belt loops. Place the Wrist Reporter on the inside of your Wrist Reporter. Place the Thumbswitch on your finger. Now use both hands to position the probe as appropriate. When the position is correct and the measurement on your Wrist Reporter looks valid, press the Thumbswitch button to store the result. As you progress through the matrix of points, the Wrist Reporter automatically shows you the current average velocity, along with the minimum and maximum readings of the traverse.

Alternative Implementations

The temperature sensing elements used may be 2252-ohm thermistors, 10 K-ohm thermistors, thermocouples, or other type of temperature sensor. The enclosure may be plastic or metal. Batteries may vary.

The General Purpose Sensor Module is configured for use with a variety of sensing probes, both analog and digital, to measure air and water temperatures, humidity, CO, CO2, light intensity, and other parameters.

Summary of System-Related Functions and Innovations

The various implementations provide a system of modules as described above that solve or minimize long-standing industry problems. A wireless network of specialty sensors and a wearable control module allows getting data from the point of measurement to the point of control, and improves communication among team members.

The various implementations offer a large increase in productivity by allowing a technician to move around, climb a ladder, drill a hole, adjust a damper or valve, speed up a pump, or otherwise use his hands and feet to implement changes while knowing the immediate effects of those changes. Multiple team members can each wear a Control Module so they can each receive and view the measurement data directly, which promotes better teamwork and higher productivity.

These system capabilities make possible new, better methods for industrial repairs and adjustments. For instance, they eliminate the back-and-forth nature of many industrial operations where the point of interest is different from the point of control. Instead of a long cycle measurement/adjustment/measurement/etc., a real-time stream of measurements is available at the point where the adjustment is being made, saving time and facilitating a more precise final result. The distributed nature of the instrument in the various implementations makes it possible for a technician to make the necessary measurements at the location of interest, transmit the measurements quickly to the location where they are most needed for decisions and adjustments, which may be a few feet or hundreds of feet away. The measurement results can be displayed on a wrist-mounted module, a head-mounted module for heads-up viewing, or annunciated in the user's ear. The user's hands during this process are free for tasks instead of being occupied by instruments.

The wireless modules provide for many different functions in different applications that previously were not possible or only possible by utilizing multiple instruments. For instance, various implementations include a mobile, wrist-mountable module that can display two or more measurements simultaneously from different sensors in different locations and store them with the time and date of the readings. These new functions produce huge benefits for several HVAC applications. They give the technician the ability to see all of the related information at the time that he is making a decision about a repair or adjustment.

The various implementations combine two operating modes that were previously only available in different instruments. One is a diagnostic or debugging mode used by a technician to discover and promptly fix problems. The other is a monitoring or datalogging mode which collects measurements regularly from distributed sensors over a period of hours, days, or weeks. The data is analyzed later, usually plotted against time to show relationships between events.

The various implementations allow a mobile module to display the results in a diagnostic mode from sensors that are also at the same time part of a datalogging network.

In places where the description above refers to particular implementations of a wireless sensors system and implementing components, sub-components, methods and sub-methods, it should be readily apparent that a number of modifications may be made without departing from the spirit thereof and that these implementations, implementing components, sub-components, methods and sub-methods may be applied to other wireless sensor systems.

What is claimed is:

1. A test and balance data gathering system comprising:
   two or more wireless sensor modules configured to removably couple to two or more locations of a heating, ventilation, and air conditioning (HVAC) system;
   wherein the two or more wireless sensor modules are configured to wirelessly couple to a control module;
   wherein each of the two or more wireless sensor modules comprises an air pressure sensor, a sensor module port, a sensing probe comprising an output port, and a flexible hose coupled directly to and between the sensor module port and the output port, each sensing probe configured to be inserted through a respective opening in a duct wall of the HVAC system and used in obtaining a pressure measurement;
   wherein the two or more wireless sensor modules are configured to directly and removably couple to the duct wall at two or more locations of the HVAC system through respective attachment mechanisms, each attachment mechanism comprising one of a clip, magnet, hook and loop fasteners, or adhesive dot;
   wherein the one of the clip, magnet, hook and loop fasteners, or adhesive dot is configured to directly couple to the HVAC system when the two or more wireless sensor modules are removably coupled to the two or more locations of the HVAC system;
   wherein the two or more wireless sensor modules are configured to obtain air pressure measurements substantially simultaneously at the two or more locations using the two or more wireless sensor modules;
   wherein the two or more wireless sensor modules are configured to transmit the air pressure measurements over a telecommunication channel to the control module;
   wherein the control module is a mobile computing device configured to execute software instructions that cause the control module to simultaneously display, in substantially real time, the air pressure measurements from at least two of the wireless sensor modules;
   wherein the test and balance data gathering system comprises a data logging mode configured to collect a plurality of measurements regularly from the wireless sensor modules over a period of days, wherein the plurality of measurements comprise the air pressure measurements;
   wherein the data logging mode is configured to store the plurality of measurements plotted against time to show a relationship between events; and
   wherein the data logging mode is configured to compare the plurality of measurements against other measurements taken from other wireless sensor modules.

2. The system of claim 1, wherein the system is configured to calculate a differential pressure from the air pressure measurements.

3. The system of claim 1, further comprising one or more repeater modules configured to wirelessly transmit the air pressure measurements to the control module.

4. The system of claim 1, wherein the control module is a smartphone configured to download the software instructions via a network.

5. The system of claim 1, wherein each attachment mechanism comprises the magnet, wherein the magnet is configured to directly couple to the HVAC system.

6. The system of claim 1, wherein each of the two or more wireless sensor modules comprises a sensor module port and a flexible hose coupled between the sensing probe and the sensor module port.

7. The system of claim 1, wherein the two or more measurements are configured to enable the user to observe an effect of an HVAC test and balance adjustment made by the user to a portion of an HVAC system made prior to the two or more measurements and wherein the two or more wireless sensor modules are configured to removably couple to the HVAC system during a period of time during which testing and balancing is being performed by the user.

8. The system of claim 1, wherein the control module is communicatively coupled to a remote server over a network, and the air pressure measurements are transmitted to the remote server for remote viewing by a computing device coupled to the remote server.

9. A test and balance data gathering system comprising:
   two or more wireless sensor modules configured to removably couple to two or more locations of a heating, ventilation, and air conditioning (HVAC) system;
   wherein the two or more wireless sensor modules are configured to wirelessly couple to a control module through a wireless radio electronic portion comprised in each of the two or more wireless sensor modules;
   wherein each of the two or more wireless sensor modules comprises an air pressure sensor, a sensing probe coupled to the air pressure sensor, and a flexible hose coupled between the sensing probe and the air pressure sensor, each sensing probe configured to be inserted through a respective opening in a duct wall of the HVAC system and used in obtaining a pressure measurement;

wherein the two or more wireless sensor modules are configured to directly and removably couple to the duct wall at two or more locations of the HVAC system through respective attachment mechanisms;

wherein the two or more wireless sensor modules are configured to obtain air pressure measurements substantially simultaneously at the two or more locations using the two or more wireless sensor modules;

wherein the two or more wireless sensor modules are configured to transmit the air pressure measurements over a telecommunication channel to the control module;

wherein the control module is a mobile computing device configured to execute software instructions that cause the control module to simultaneously display, in substantially real time, the air pressure measurements from at least two of the wireless sensor modules;

wherein the control module is communicatively coupled to a remote server over a network, and the air pressure measurements are transmitted to the remote server for remote viewing by a computing device coupled to the remote server;

wherein the test and balance data gathering system comprises a diagnostic mode and a data logging mode;

wherein the diagnostic mode is configured to collect the air pressure measurements from the wireless sensor modules and display them in substantially real time;

wherein the data logging mode is configured to collect a plurality of measurements regularly from the wireless sensor modules over a period of days, wherein the plurality of measurements comprise the air pressure measurements;

wherein the data logging mode is configured to store the plurality of measurements plotted against time to show a relationship between events; and wherein the data logging mode is configured to compare the plurality of measurements against other measurements taken from other wireless sensor modules.

10. The system of claim 9, wherein the system is configured to calculate a differential pressure from the air pressure measurements.

11. The system of claim 9, wherein the two or more measurements are configured to enable the user to observe an effect of an HVAC test and balance adjustment made by the user to a portion of an HVAC system made prior to the two or more measurements and wherein the two or more wireless sensor modules are configured to removably couple to the HVAC system during a period of time during which testing and balancing is being performed by the user.

12. A test and balance data gathering system comprising:
two or more wireless sensor modules configured to removably couple to two or more locations of a heating, ventilation, and air conditioning (HVAC) system, the two or more locations remote from a user;

wherein each of the two or more wireless sensor modules are configured to wirelessly couple to a control module;

wherein each of the two or more wireless sensor modules comprises a first sensor module port, a second sensor module port, a sensing probe configured to couple to the first sensor module port through a flexible hose and configured to be inserted through a respective opening in a duct wall of the HVAC system to obtain a pressure measurement, and an air pressure sensor configured to measure a differential pressure between an air pressure received at the first sensor module port and an air pressure received at the second sensor module port;

wherein the two or more wireless sensor modules are configured to removably couple to a duct wall at the two or more locations of the HVAC system through respective attachment mechanisms configured to directly couple to the HVAC system;

wherein each sensing probe comprises a first portion comprising an input and a second portion comprising an output, wherein a longest length of the first portion is substantially orthogonal to a longest length of the second portion;

wherein the two or more wireless sensor modules are configured to transmit measurements of the differential air pressure over a telecommunication channel to the control module;

wherein the control module is a mobile computing device configured to execute software instructions that cause the control module to simultaneously display, in substantially real time, the measurements of the differential air pressure from at least two of the wireless sensor modules;

wherein the test and balance data gathering system comprises a diagnostic mode and a data logging mode;

wherein the diagnostic mode is configured to collect the measurements of the differential air pressure from the wireless sensor modules and display them in substantially real time;

wherein the data logging mode is configured to collect a plurality of measurements regularly from the wireless sensor modules over a period of days, wherein the plurality of measurements comprise the measurements of the differential air pressure;

wherein the data logging mode is configured to store the plurality of measurements plotted against time to show a relationship between events; and wherein the data logging mode is configured to compare the plurality of measurements against other measurements taken from other wireless sensor modules.

13. The system of claim 12, wherein the measurements of the differential air pressure are configured to enable the user to observe an effect of an HVAC test and balance adjustment made by the user to a portion of an HVAC system made prior to the two or more measurements.

14. The system of claim 12, wherein the two or more wireless sensor modules are configured to removably couple to the HVAC system during a period of time during which testing and balancing is being performed by the user.

15. The system of claim 12, wherein each attachment mechanism comprises one of a clip, magnet, hook and loop fasteners, or adhesive dot.

16. The system of claim 12, further comprising one or more repeater modules wirelessly configured to transmit the measurements of differential air pressure to the control module.

17. The system of claim 12, wherein the control module is one of a personal digital assistant (PDA), smartphone, or mobile computer.

18. The system of claim 12, wherein the measurements of the differential air pressure are obtained from a difference between an air pressure conducted to the first sensor module port and an air pressure conducted to the second sensor module port of each of the two or more wireless sensor modules.

* * * * *